(12) United States Patent
Rogers et al.

(10) Patent No.: US 10,737,817 B2
(45) Date of Patent: Aug. 11, 2020

(54) METHOD, APPARATUS, AND SYSTEM FOR ROBOTIC ARTICLE HANDLING

(71) Applicant: YASKAWA AMERICA INC., Waukegan, IL (US)

(72) Inventors: John Charles Rogers, Danville, CA (US); Hiroyuki Handa, Palatine, IL (US); John D. Payne, Manhattan Beach, CA (US); Carl Michael Traynor, Lake Forest, IL (US)

(73) Assignee: YASKAWA AMERICA, INC., Waukegan, IL (US)

( * ) Notice: Subject to any disclaimer, the term of this patent is extended or adjusted under 35 U.S.C. 154(b) by 218 days.

(21) Appl. No.: 15/703,942

(22) Filed: Sep. 13, 2017

(65) Prior Publication Data

US 2018/0086489 A1    Mar. 29, 2018

Related U.S. Application Data

(60) Provisional application No. 62/399,493, filed on Sep. 26, 2016.

(51) Int. Cl.
*B25J 9/04*    (2006.01)
*B65B 35/36*    (2006.01)
(Continued)

(52) U.S. Cl.
CPC .............. *B65B 35/36* (2013.01); *B25J 9/042* (2013.01); *B25J 9/1602* (2013.01);
(Continued)

(58) Field of Classification Search
CPC ...................................................... B25J 9/042
See application file for complete search history.

(56) References Cited

U.S. PATENT DOCUMENTS 4,620,831 A * 11/1986 Poncet ..................... B25J 9/044
414/744.3
4,829,840 A * 5/1989 Torii ...................... B25J 18/025
74/490.03
(Continued)

FOREIGN PATENT DOCUMENTS

CN        203305214 U  * 11/2013
CN        104249366 A  * 12/2014
(Continued)

OTHER PUBLICATIONS

Bonkenburg, "Robotics in Logistics", DHL Trend Research, Mar. 2016, DHL Customer Solutions & Innovation.

*Primary Examiner* — Gerald McClain
(74) *Attorney, Agent, or Firm* — Mori & Ward, LLP

(57) ABSTRACT

A robotic handling apparatus includes a vertical motion mechanism and a first arm member connected to the vertical motion mechanism. The first arm member is movable in a vertical direction by the vertical motion mechanism. The robotic handling apparatus includes a second arm member connected to the vertical motion mechanism via the first arm member, and a first drive unit configured to drive the second arm member to pivot about a first axis. An end effector is connected to the second arm to transfer an article from a first position to a second position by the motion of the vertical motion mechanism, first arm member, and second arm member, the first arm member being mounted to a side of the vertical motion mechanism relative to the vertical direction.

27 Claims, 18 Drawing Sheets

(51) Int. Cl.
*B25J 18/02* (2006.01)
*B25J 9/16* (2006.01)
*B25J 15/02* (2006.01)
*B25J 15/06* (2006.01)
*B25J 15/00* (2006.01)
*B65G 1/04* (2006.01)

(52) U.S. Cl.
CPC ........... *B25J 15/0014* (2013.01); *B25J 15/02* (2013.01); *B25J 15/0616* (2013.01); *B25J 18/02* (2013.01); *B65G 1/0435* (2013.01)

(56) References Cited

U.S. PATENT DOCUMENTS

| | | | | |
|---|---|---|---|---|
| 4,850,782 A * | 7/1989 | Focke | ................... | B65G 61/00 414/793 |
| 4,976,584 A * | 12/1990 | Focke | ................... | B65G 61/00 414/789.6 |
| 5,085,556 A * | 2/1992 | Ohtomi | ................... | B25J 9/023 414/744.3 |
| 5,503,513 A * | 4/1996 | Detriche | ................ | B25J 9/1615 414/744.5 |
| 6,285,152 B1 * | 9/2001 | Ookura | ................... | B25J 9/042 318/568.11 |
| 6,290,448 B1 * | 9/2001 | Focke | ................... | B65G 47/914 198/374 |
| 7,531,979 B2 | 5/2009 | Ou et al. | | |
| 8,442,686 B2 | 5/2013 | Saito et al. | | |
| 9,457,477 B1 * | 10/2016 | Rublee | ................... | B25J 15/0023 |
| 10,029,369 B1 * | 7/2018 | Carlisle | ................... | B25J 9/1676 |
| 10,173,323 B2 * | 1/2019 | Carlisle | ................... | B25J 13/085 |
| 10,399,226 B2 * | 9/2019 | Ho | ........................ | B25J 18/04 |
| 10,407,183 B2 * | 9/2019 | Potters | ................... | B65G 9/002 |
| 2001/0035065 A1 | 11/2001 | Hashimoto et al. | | |
| 2005/0234327 A1 * | 10/2005 | Saracen | ................ | A61B 6/0457 600/407 |
| 2013/0057106 A1 | 3/2013 | Sajikawa et al. | | |
| 2014/0292113 A1 | 10/2014 | Koike et al. | | |
| 2016/0079905 A1 | 3/2016 | Swamy | | |
| 2016/0136818 A1 * | 5/2016 | Kitahara | ................... | B25J 9/042 414/222.07 |
| 2017/0172676 A1 * | 6/2017 | Itkowitz | ................... | A61B 34/37 |
| 2017/0326737 A1 * | 11/2017 | Martin | ................... | B25J 9/0018 |
| 2018/0009111 A1 * | 1/2018 | Ho | ........................ | B25J 9/1687 |
| 2018/0043529 A1 * | 2/2018 | Ho | ........................ | B25J 18/04 |
| 2019/0127085 A1 * | 5/2019 | Krauss | ................... | B64C 39/024 |
| 2019/0375097 A1 * | 12/2019 | Ho | ........................ | B25J 18/04 |

FOREIGN PATENT DOCUMENTS

CN 106272381 A * 1/2017
JP 5397409 B2 12/2012

* cited by examiner

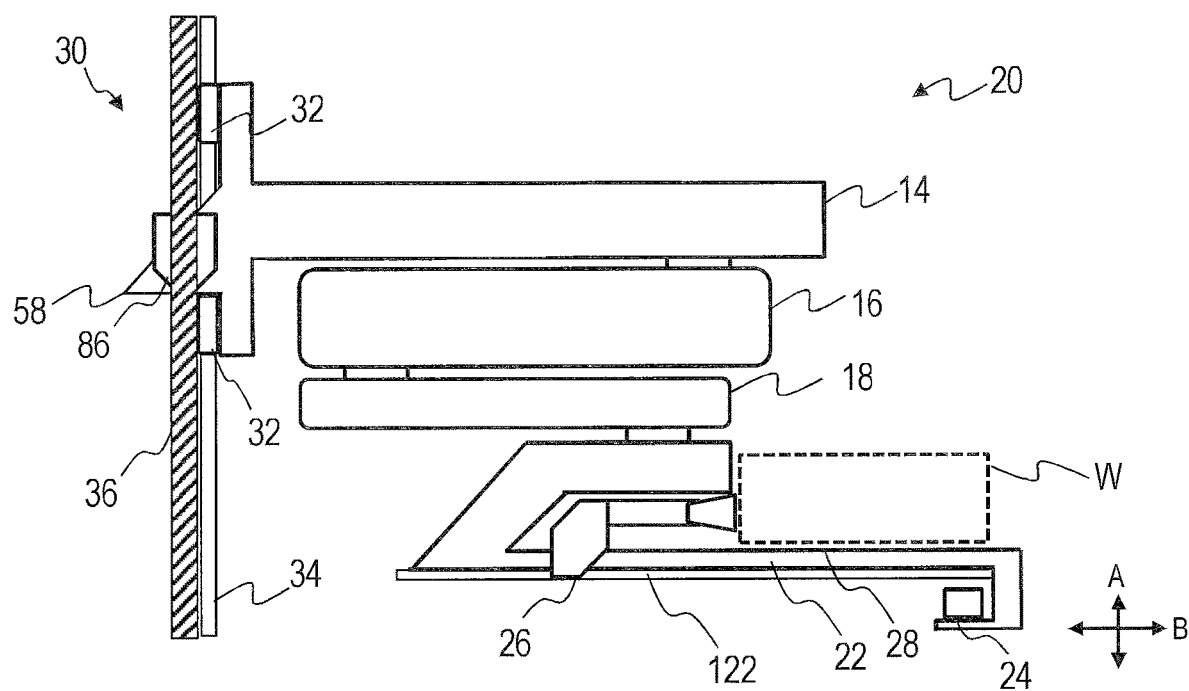

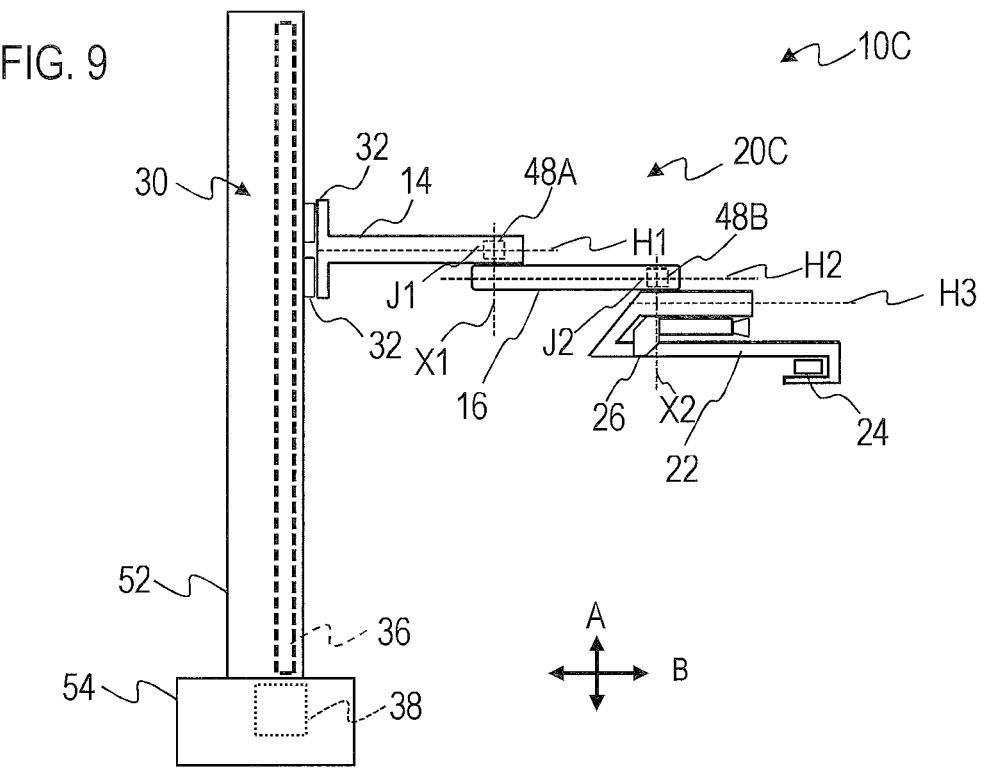
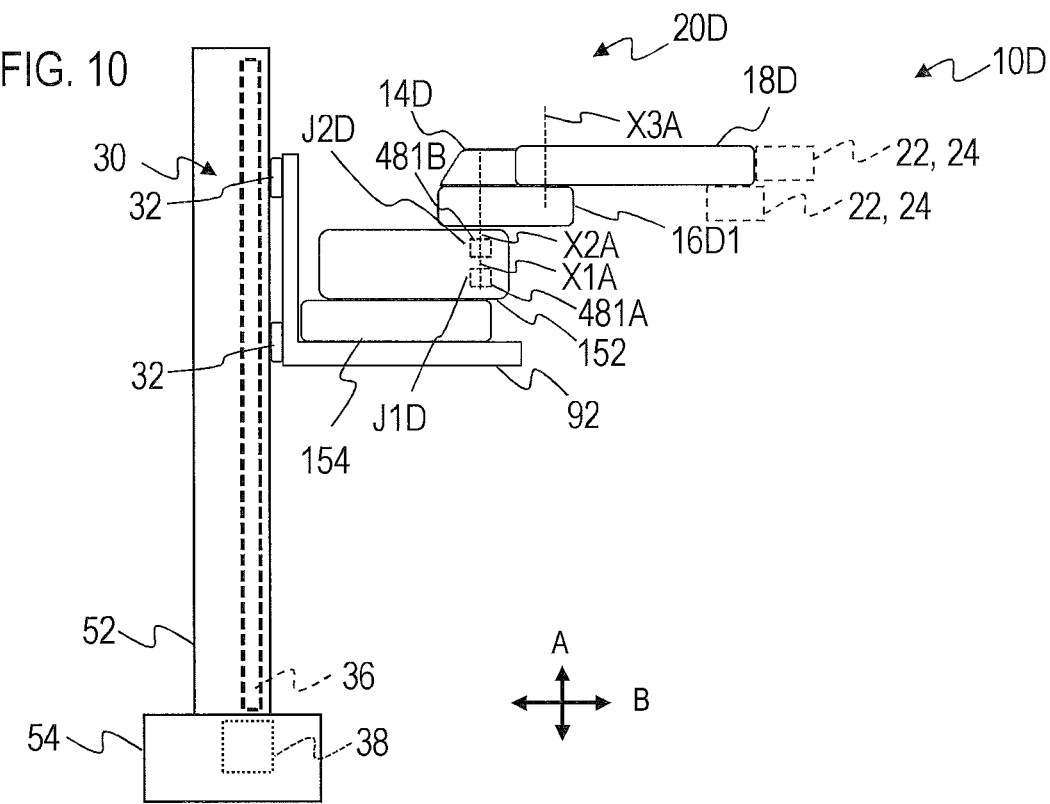

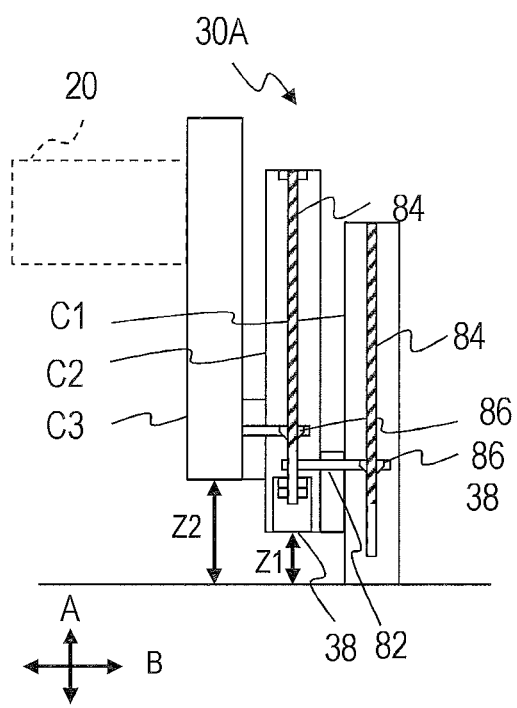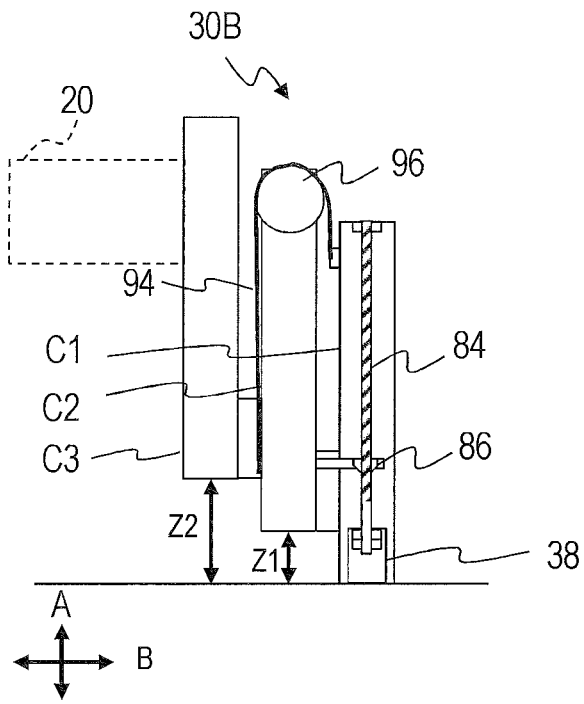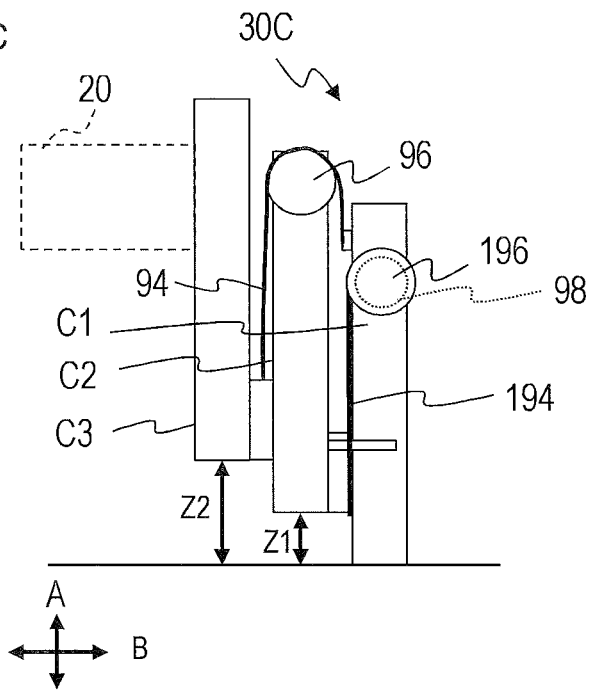

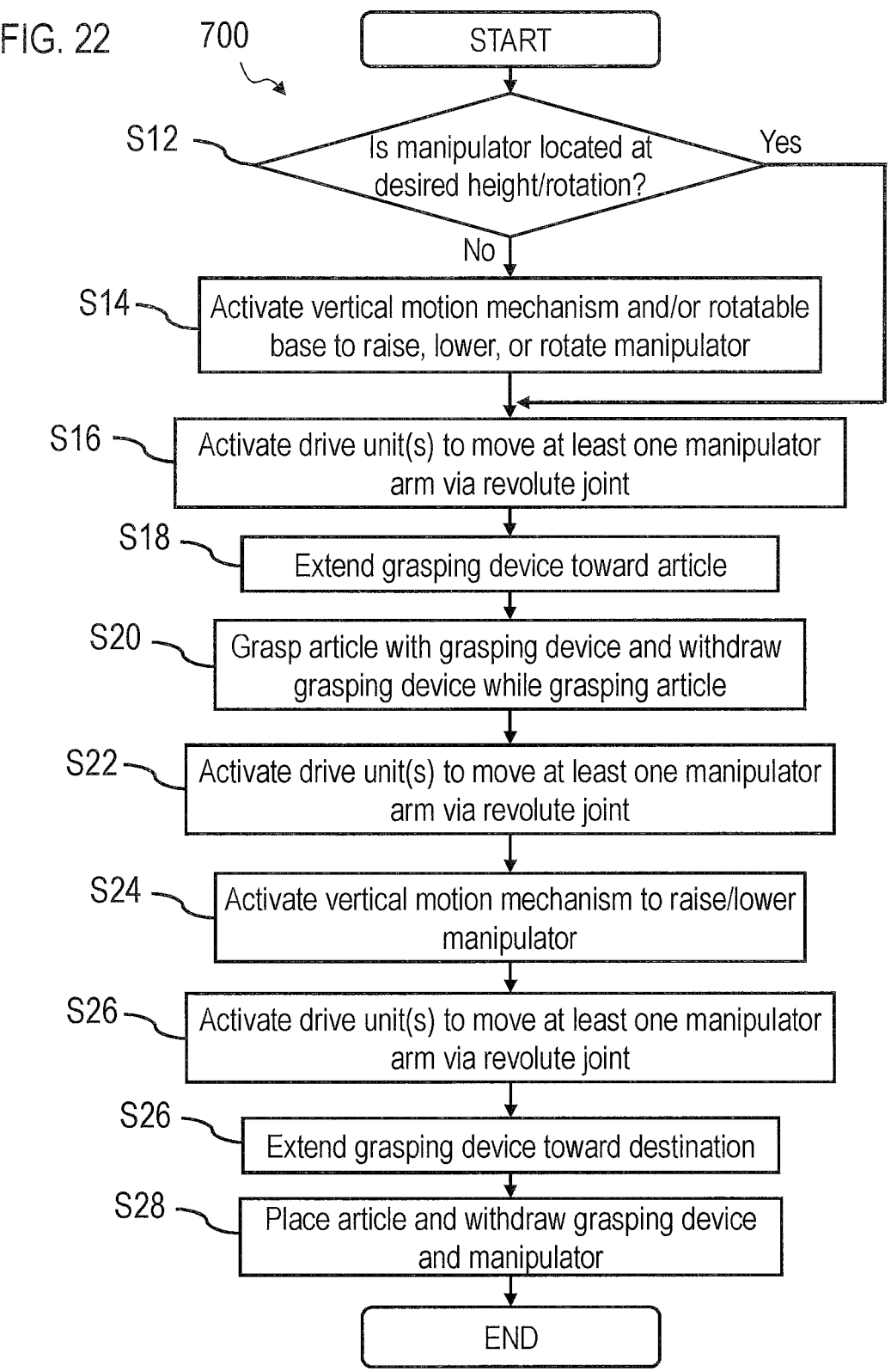

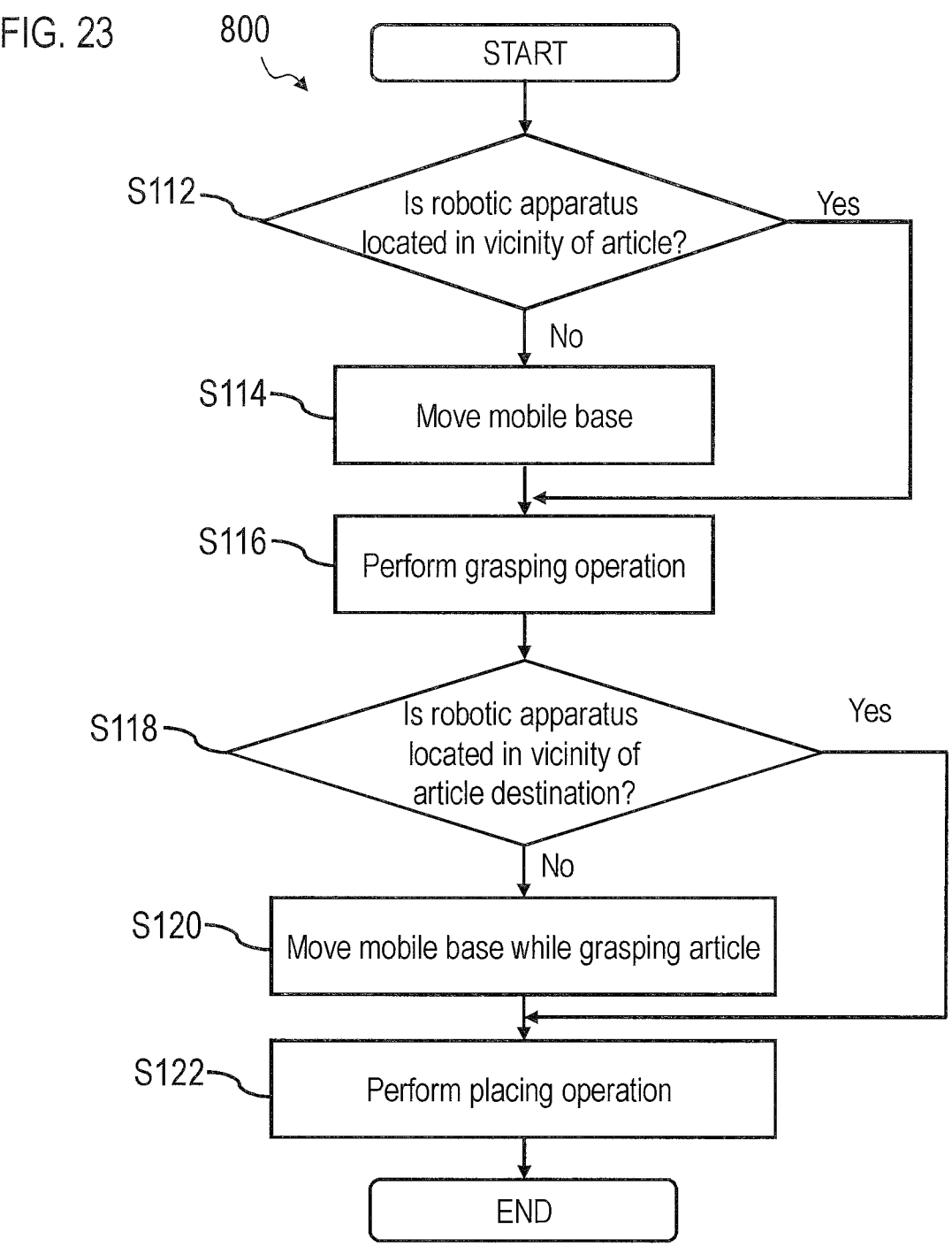

METHOD, APPARATUS, AND SYSTEM FOR ROBOTIC ARTICLE HANDLING

CROSS-REFERENCE TO RELATED APPLICATION

The present application claims priority under 35 U.S.C. § 119(e) to U.S. provisional Application No. 62/399,493, filed on Sep. 26, 2016, the entire contents of which are herein incorporated by reference.

BACKGROUND OF THE INVENTION

Field of the Invention

The present invention relates to a method, apparatus, and system for handling an article.

Discussion of the Background

For decades, robots have been used in industrial applications for various purposes. Of the multiple types of robots used in industrial applications, vertical articulated robots have been dominant for their ability to provide six degrees of freedom and their ability to accommodate multiple types of payloads. Industrial robots have been employed in open spaces in which the environment surrounding the robot is specifically designed for vertical articulation. These open spaces are necessarily large to address the possibility of interference between links of the robot, including an elbow of the robot, which can occur when the robot is in certain poses in which it is possible to come into contact with the surrounding environment. Vertical articulated robots, while useful in a variety of applications, are not well adapted for use in certain applications.

SUMMARY OF THE INVENTION

The present invention advantageously provides a robotic handling apparatus including a vertical motion mechanism and a first arm member connected to the vertical motion mechanism. The first arm member is movable in a vertical direction by the vertical motion mechanism when the robotic handling apparatus is provided in an operational state. The robotic handling apparatus includes a second arm member connected to the vertical motion mechanism via the first arm member, a first drive unit configured to drive the second arm member to pivot about a first axis, and an end effector is connected to the second arm and configured to transfer an article from a first position to a second position by the motion of the vertical motion mechanism, first arm member, and second arm member, the first arm member being mounted to a side of the vertical motion mechanism relative to the vertical direction.

The present invention advantageously provides a robotic handling system including a robotic handling apparatus including a vertical motion mechanism, a first arm member connected to the vertical motion mechanism and movable in a vertical direction by the vertical motion mechanism when the robotic handling apparatus is provided in an operational state, and a second arm member connected to the vertical motion mechanism via the first arm member. The robotic handling apparatus also includes a first drive unit configured to drive the second arm member to pivot about a first axis, and an end effector connected to the second arm and configured to transfer an article from a first position to a second position by the motion of the vertical motion mecha- nism, first arm member, and second arm member, the first arm member being mounted to a side of the vertical motion mechanism relative to the vertical direction. The robotic handling system also includes a mobile platform configured to move between a plurality of positions in a workspace.

The present invention advantageously provides a method for robotic article handling, the method including moving a first arm member and a second arm member connected to the first arm member by a vertical motion mechanism, pivoting the second arm member about a first axis so as to position an end effector connected to the second arm at a position adjacent to an article, and grasping an article located at a first position with a grasping device of an end effector. The method includes transferring the article from the first position to the second position. During the moving, pivoting, grasping, and transferring, the first arm member, the second arm member, and the end effector are mounted to a side of the vertical motion mechanism relative to a vertical direction.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 6 is a cross-sectional view of a vertical motion mechanism and manipulator according to an embodiment of the present invention;

FIG. 9 is a schematic side view illustrating another manipulator according to an embodiment of the present invention;

FIG. 10 is a schematic side view illustrating a robotic apparatus including a four-bar link manipulator according to an embodiment of the present invention;

FIGS. 16a-16c are schematic cross-sectional views of vertical motion mechanisms according to embodiments of the present invention;

FIG. 22 is a flowchart illustrating an exemplary process for handling an article according to an embodiment of the present invention; and FIG. 23 is a flowchart illustrating an exemplary process for handling an article according to an embodiment of the present invention.

DETAILED DESCRIPTION OF EXEMPLARY EMBODIMENTS OF THE INVENTION

Figure 1:
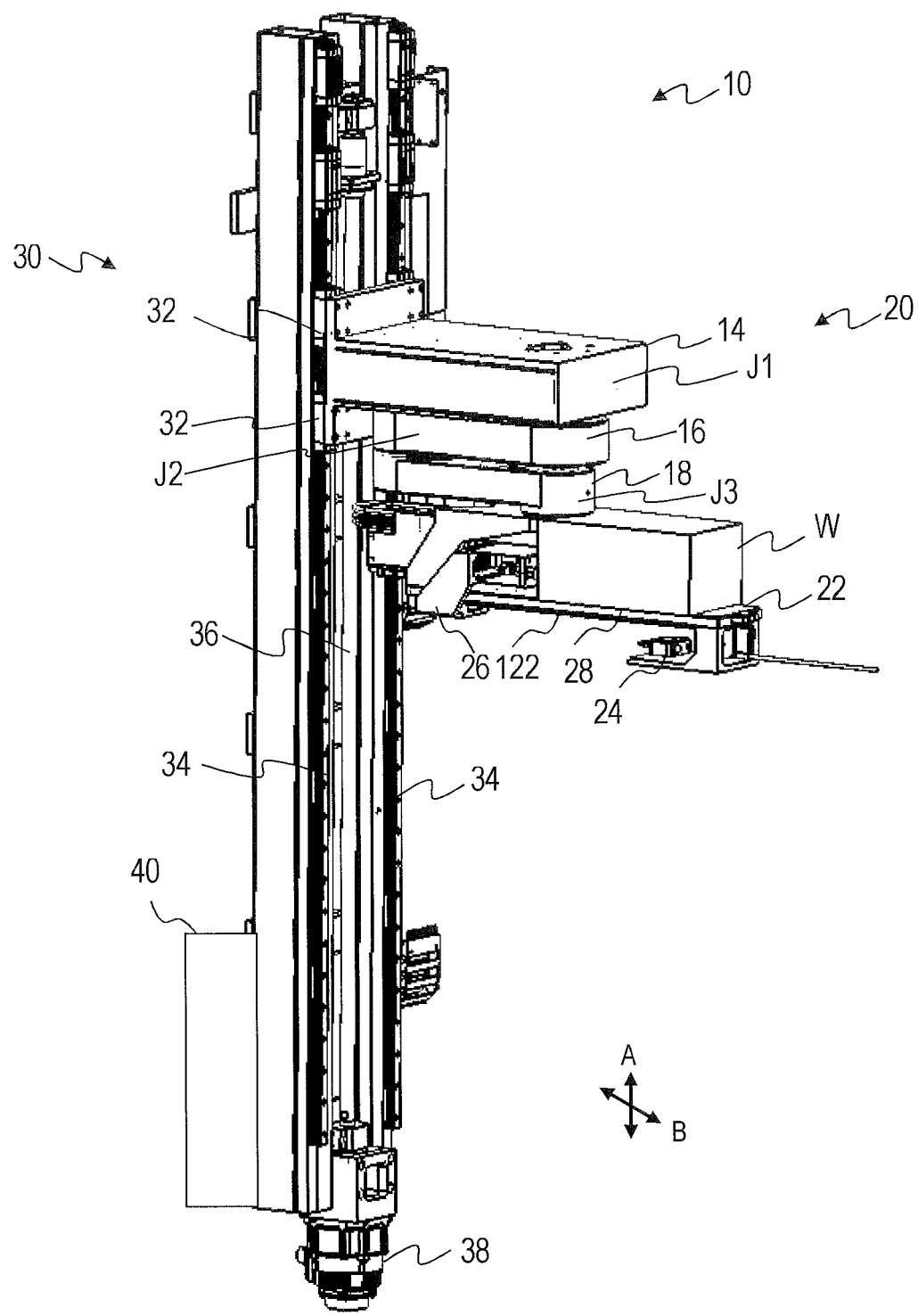
FIG. 1 is a partially-schematic perspective view of a robotic apparatus according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

The recent increase in electronic commerce has created significant demand in preparing items within a warehouse for shipment to a consumer. Frequently, human employees select items from stocking shelves in order fulfillment centers, warehouses, or distribution centers, which each include shelving at various heights. As vertical articulated robots require significantly large open spaces, such robots are inappropriate for use in narrow spacing, such as stocking shelves. Vertical articulated robots are unsuitable, for example, in Very Narrow Aisle (VNA) or Very Narrow Shelf (VNS) environments. Vertical articulated robots with six degrees of freedom can interfere with storage structures, introduce additional cost due to the high number of articulated joints, and require complex and expensive tools. Vertical articulated robots are also of limited use even when mounted on a vehicle. The significant size and weight of a standard industrial robot reflects the intention to use such robots in a stationary position, fixed on a floor. As a result of the size and weight of standard industrial robots in warehouse applications, they have been deployed with vehicles that provide significant weight for counter-balancing and, in some cases, outriggers to provide stability. Such vehicles have sufficient area to move to allow a standard industrial robot to extend to the lowest area/shelves of a storage structure.

The additional axes of motion included in a six degree of freedom robot introduce additional cost. These axes also introduce additional complexity when planning a path of motion for the robot and a posture from which pick or place a workpiece without interfering or colliding with a storage structure. Vertical articulated robots are limited to open environments where there are no existing structures. Thus, there is a need for an improved article handling robot that is suitable for use in narrow environments.

In the present application, a vertical direction corresponds to a direction aligned with a force of gravity. The vertical direction also corresponds to a direction aligned with the force of gravity when the robotic apparatus is positioned in an operational state.

A configuration of an exemplary robot, or robotic apparatus 10 will be described according to an embodiment of the invention. FIG. 1 depicts an embodiment of an exemplary robotic apparatus 10 that includes a columnar robot arm or horizontal mechanism formed by manipulator 20. Robotic apparatus includes a vertical motion mechanism 30 to move manipulator 20 in a vertical direction A orthogonal to a horizontal direction B. Robotic apparatus 10 also includes control unit (controller) 40 for controlling the manipulator 20 and vertical motion mechanism 30. Robotic apparatus 10 can be programmed to move with respect to orientation, location, and operation sequence via control unit 40.

With continued reference to FIG. 1, robotic apparatus 10 is a work machine that can be equipped for the automated transfer, manipulation, and/or processing of objects with tools, and can be programmed to move with respect to numerous movement axes. Robotic apparatus 10 includes a robot arm unit (manipulator) with numerous links formed by individual arms 14, 16, 18 connected at corresponding revolute joints J1, J2, J3, and an end effector 22. A first arm member, first arm 14, is connected to vertical motion mechanism 30. A second arm member, second arm 16, is connected to a distal end portion of first arm 14. A third arm member, third arm 18 is connected to a distal end portion of second arm 16. Joint J1 is formed by first arm 14 and second arm 16, joint J2 is formed by second arm 16 and third arm 18, and third joint J3 is formed by third arm 18 and end effector 22. First arm 14, second arm 16, and third arm 18 are vertically-arranged horizontally-articulated arm members located on a side of the vertical motion mechanism 30. End effector 22 is also located on a side of the vertical motion mechanism 30. That is, none of the arms 14, 16, and 18 or end effector 22 overlap vertical motion mechanism 30 in the vertical direction in any posture achievable by robotic apparatus 10. By providing each of the arms 14, 16, and 18 and end effector 22 on a side (vertical side surface) of the robotic apparatus 10, greater range of vertical movement is provided and greater reach is provided at each vertical location along the range of vertical movement. For example, robotic apparatus 10 is configured to fully extend arms 14, 16, and 18 and end effector 22 at every vertical position. This increases a range in which the robotic apparatus 10 can operate and allows robotic apparatus 10 greater reach in narrow shelf spaces and on sides of warehouse aisles.

Revolute joints are one degree-of-freedom joints that provide rotational motion about a single axis. Revolute joints provide rotational movement in a clockwise direction and a counter-clockwise direction. In various embodiments described herein, the revolute joints are oriented so as to be incapable of motion about a horizontal axis.

Programmable control unit 40, controls and regulates the movement sequences during operation of the robot. Individual links, arms 14, 16, and 18, are moved via respective drives, such as electric drives, which are controlled by the control unit 40 with respect to the movement axes. Similarly, end effector 22 is moved by a respective drive, such as an electric drive, controlled by control unit 40. Control unit 40 can be provided in a separate housing as depicted in FIG. 1. Control unit 40 can also be provide in a housing of robotic apparatus 10.

End effector 22 is connected to a distal end portion of third arm 18, and includes a sensor 24 and a grasping device 26. Thus, manipulator 20 includes first arm 14, second arm 16, third arm 18, and end effector 22, each of which is horizontally-articulated. Manipulator 20 is configured as a SCARA (selective compliance articulated robot arm), for example. Vertical motion mechanism 30 forms a major vertical axis, while manipulator 20 includes minor horizontal link axes. As can be seen in FIG. 1, all of the arm members, first arm 14, second arm 16, third arm 18, and end effector 22, are located to the side of the vertical motion mechanism 30, regardless of the posture of the first arm 14, second arm 16, third arm 18, and end effector 22. Furthermore, none of the arms 14, 16, and 18, and end effector 22 rotates about a horizontal axis. Thus, there is no possibility that one of the arms 14, 16, 18, or end effector 22 interferes with another one of the arms 14, 16, 18, and end effector 22. This is true for any vertical position. Furthermore, the second arm 16, third arm 18, and end effector 22 can be placed at a fully extended position in the horizontal direction at every vertical position, including both a top position and a bottom position. Thus, robotic apparatus 10 has an increased range as compared with a device in a member is attached to an upper surface of a body or base. Thus, interference is minimized between arms members of the robotic apparatus 10, while a long horizontal reach of robotic apparatus 10 is achieved. As will be discussed below, interference is minimized when the robotic apparatus 10 is mounted to a support structure, provided with a stationary base, provided with a rotational base, or provided with a mobile base.

With continued reference to FIG. 1, end effector 22 of manipulator 20 includes a sensor 24 and grasping device 26. End effector 22 includes a support surface 28 upon which an article (workpiece) W can rest. End effector 22 also includes a linear motion mechanism 122 to extend and retract grasping device 26, as described in further detail below. One or more sensors 24 detect a position of an article, shelf, obstacle, or other object in a working area. For example, sensor 24 can include sensing detectors, which can be contact sensors (e.g. proximity sensors), or non-contact sensors (e.g. laser sensors). Sensor 24 can include optical sensors such as vision detectors that can be used to assist control unit 40 to provide instructions to vertical motion mechanism 30 and manipulator 20 to pick up or acquire an article W, transport and move such article W between two positions, and then drop/off release the article W. Transporting and moving article W can include rotational movements, movements along curved or linear paths, and lifting or lowering vertical movements. Article W can be single article or workpiece. Article W can also be a container containing one or more articles, such as a package, bin, tray, case, or pallet.

As illustrated in FIG. 1, the vertical motion mechanism 30 includes a driven mechanism 36 and a vertical motion drive unit 38. Vertical motion mechanism 30 additionally includes at least one guide 32, and at least one rail 34. In order to support the weight of manipulator 20, one or more guides 32 can be provided. The guide 32 is slidably attached to rail 34 and provides support to manipulator 20. As illustrated in FIG. 1 one or more rails 34 can be provided, each rail 34 supporting at least one guide 32. Each guide 32 is secured to a proximal end of first arm 14. Driven mechanism 36 is located between each of the rails 34, and is brought into motion by vertical motion drive unit 38. Vertical motion drive unit 38 is, for example a servomotor which imparts rotational motion to driven mechanism 36 to selectively raise and lower manipulator 20 and guides 32.

Control unit 40 controls the actuation state of the vertical motion drive unit 38, causing the manipulator 20 to move vertically. First arm 14, second arm 16, third arm 18, and end effector 22 each move together in vertical direction A according to the actuation of vertical motion drive unit 38. Thus, control unit 40 controls the vertical movement of manipulator 20, the revolute movement of the individual moveable arms, and an extension/retraction of grasping device 26 in order to approach an article W located at an origin (first) position, position end effector 22 adjacent to article W, extend grasping device 26 and secure article W, retract article W to support article W on support surface 28, transport article W to a position that neighbors a destination (second) position, position end effector 22 adjacent to the destination position, extend grasping device 26 to push article W to the second position, and discontinue the grasping action of grasping device 26 and thereby release article W. When grasping device 26 is a suction device, suction is applied to article W to securely grasp the article W. Grasping action can be discontinued by suspending or terminating the application of suction by the suction device. However, grasping device 26 can include a gripper in addition to or in place of a suction device. Any end effector configuration can be employed in manipulator 20, provided that the end effector is capable of transferring article W from a first location to a second location.

Figure 2:
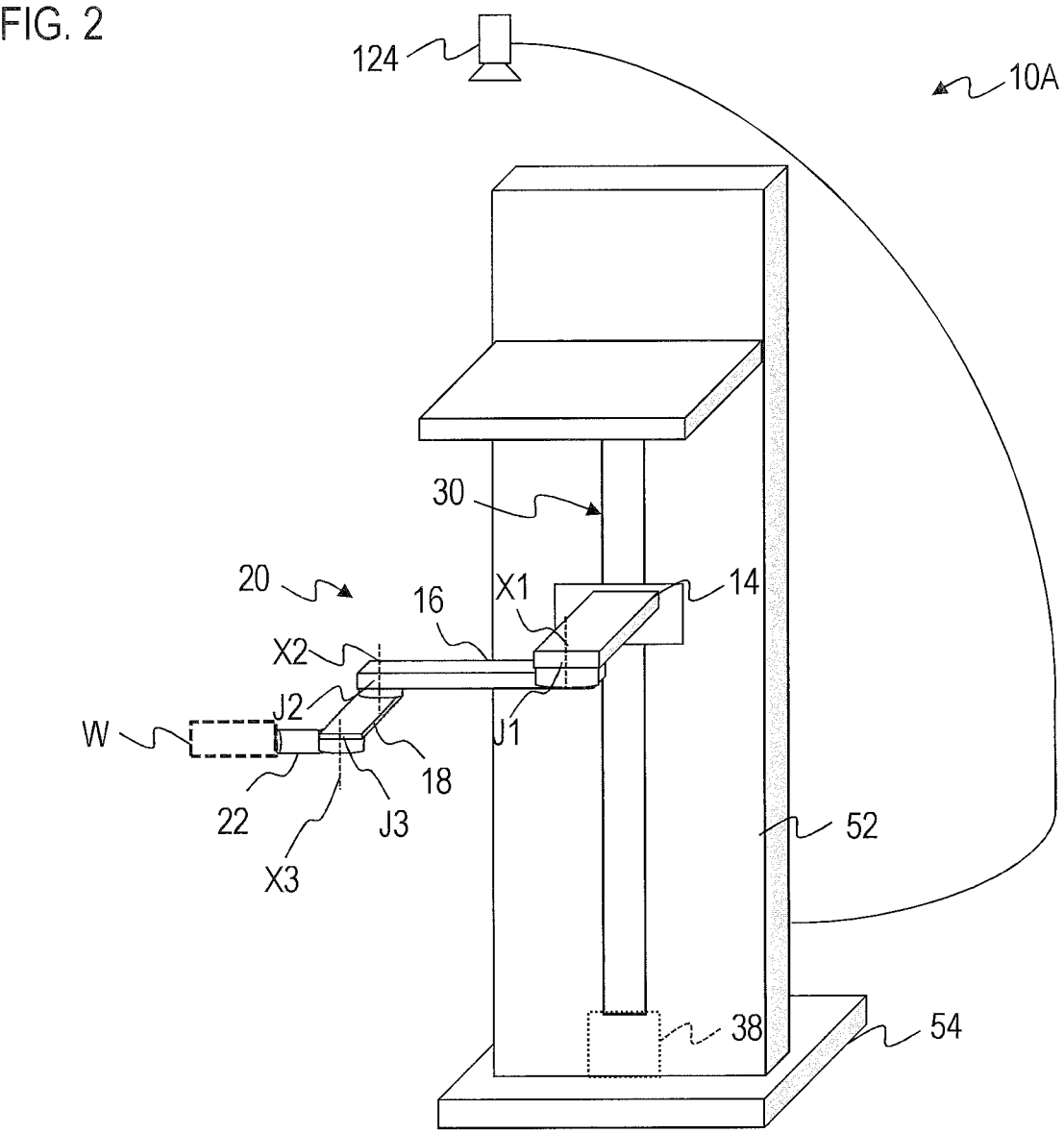
FIG. 2 is a schematic view illustrating a robotic apparatus according to an embodiment of the present invention.

As illustrated in FIG. 1, robotic apparatus 10 can be mounted to a support structure such as a wall, work cell, beam, or other support structure that forms a fixed platform. With reference to FIG. 2, robotic apparatus 10A can also be formed as a free-standing robot. Robotic apparatus 10A includes a housing 52 connected to a base 54. Base 54 is secured to a floor to form a fixed base, and provides support for each of the components of robotic apparatus 10A including manipulator 20 and vertical motion mechanism 30. As described in greater detail below, base 54 can be formed as a rotatable base. The base 54 and housing 52 secure manipulator 20, including first arm 14, second arm 16, third arm 18, and end effector 22, and vertical motion mechanism 30, which includes vertical motion drive unit 38. Control unit 40 can be provided within housing 52 or base 54, and is in communication with an external sensor 124. Control unit 40 can also be provided external to the housing 52 of robotic apparatus 10A, similar to the manner depicted in FIG. 1. For clarity of illustration, sensor 24, suction device 26, and support surface 28, rails 34, and driven mechanism 36 are omitted from the depiction provided in FIG. 2.

First arm 14 can be non-rotatably mounted to vertical motion mechanism 30. Second arm 16 is connected to first arm 14 via revolute joint J1 and is rotatable (pivotable) about axis X1. Third arm 18 is connected to second arm 16 via revolute joint J2 and is rotatable about axis X2. End effector 22 is connected to third arm 18 via revolute joint J3 and is rotatable about axis X3. End effector 22 is able to acquire article W by grasping the article W, for example. End effector 22 can thereby lift, lower, move, and subsequently release article W so as to transfer article W from a first location to a second location. Thus, robotic apparatus 10 is advantageously configured for use in a warehouse environment, especially in VNS or VNA environments, where robotic apparatus 10 can both place and pick articles W from storage locations.

As with robotic apparatus 10, in robotic apparatus 10A, vertical motion mechanism 30 forms a major vertical axis, while manipulator 20 includes minor horizontal link axes that rotate about vertical axes. All of the arm members are located to the side of the vertical motion mechanism 30, regardless of the posture of the first arm 14, second arm 16, and third arm 18. Any end effector configuration can be employed in manipulator 20, provided that the end effector is capable of transferring article W from a first location to a second location.

Figure 3:
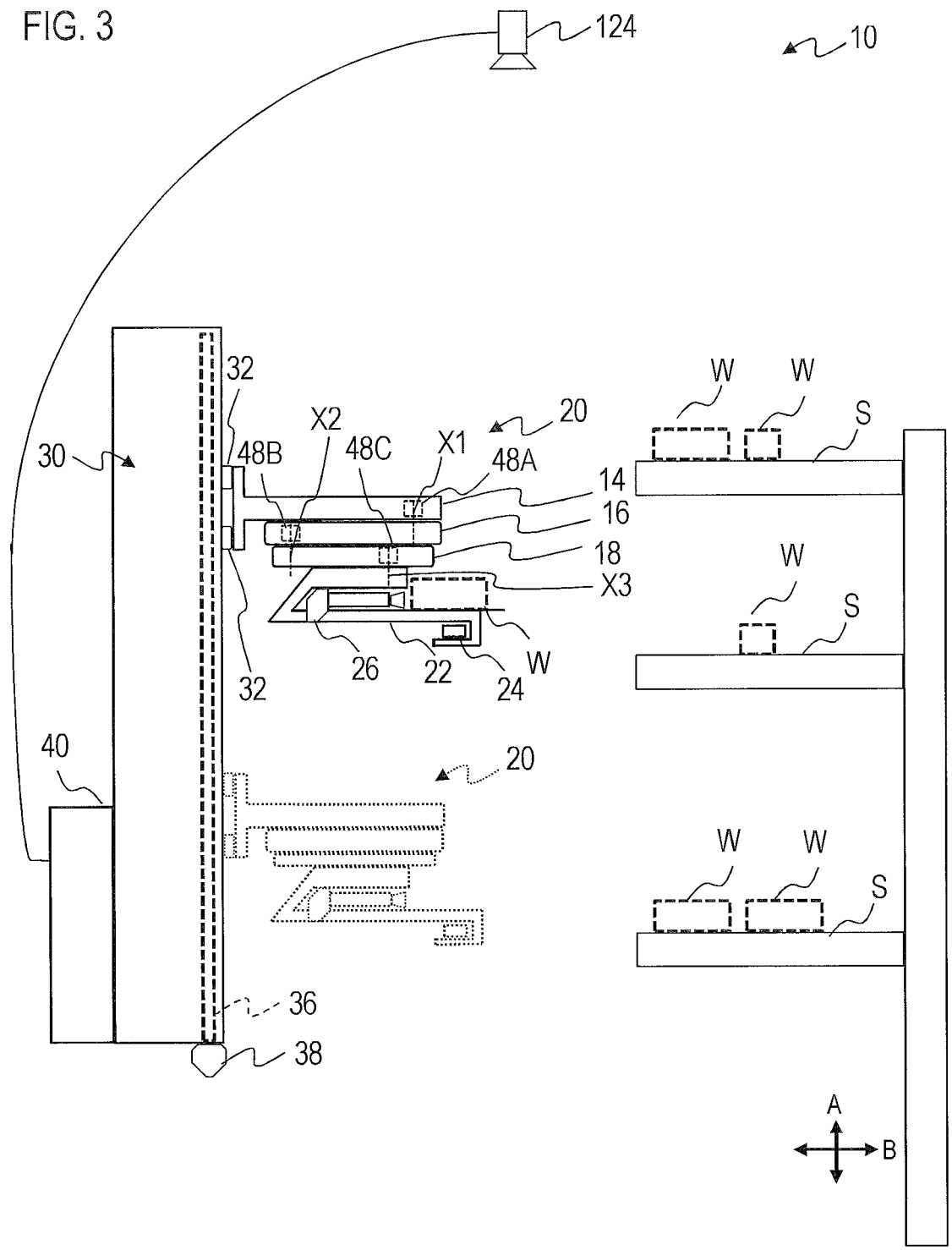
FIG. 3 is a schematic side view illustrating a robotic apparatus with a control unit according to an embodiment of the present invention.

Details of the motion-enabling configuration of robotic apparatus 10 will now be described with reference to FIG. 3. First arm 14 is moved upward and downward in vertical direction A according to the operation of vertical motion mechanism 30 when robotic apparatus 10 is in an operational state. A first drive unit 48A is disposed within first arm 14. The second arm 16 is connected to a distal end portion of first arm 14 and is driven to rotate about axis X1 according to the operation of drive unit 48A. A second drive unit 48B is disposed within second arm 16. The third arm 18 is connected to a distal end portion of the second arm 16 and is driven to rotate about axis X2 according to the operation of drive unit 48B. A third drive unit 48C is disposed within third arm 18. The end effector 22 is connected to a distal end portion of the third arm 18 and is driven to rotate about an axis X3 according to the operation of drive unit 48C. Revolute motion about axes X1, X2, and X3 allow end effector 22 to move within a horizontal plane to approach shelves S upon which workpieces W are supported. Thus, a distance between manipulator 20 and a particular workpiece W as measured in horizontal direction B is controlled by drive units 48A, 48B, and 48C based on commands issued by control unit 40. Each of the axes X1, X2, and X3 extend vertically so as to be parallel with a translational motion of manipulator 20 in the vertical direction A. Thus, the motion of second arm 16, third arm 18, and end effector 22 occurs by rotating each in a horizontal plane. The first arm 14, second arm 16, third arm 18, and end effector 22 are capable of rotation about vertical axes X1, X2, and X3, and are each incapable of rotation about a horizontal axis. In the position illustrated in FIG. 3, the first arm 14, second arm 16, third arm 18, and end effector 22 are vertically stacked. When these components are positioned in this vertically-stacked configuration and retracted toward vertical motion mechanism 30, they provide a tucked position in which the manipulator 20 can be moved upward and downward in vertical direction A while assuming a narrow profile in the horizontal direction B. In this tucked position, first arm 14, second arm 16, third arm 18, and end effector 22 overlap each other, minimizing a horizontal profile of manipulator 20. This allows manipulator 20 to be closely positioned to shelves S while maintaining the ability to avoid interference with the shelves S and articles W. First arm 14, second arm 16, third arm 18, and end effector 22 can be fully extended at every vertical position, including the top position and the bottom position, in order to reach deep into shelves S. Furthermore, revolute joints J1, J2, and J3 reduce the torque requirements for the drive units 48A, 48B, and 48C by eliminating the need of the drive units 48A, 48B, and 48C to drive motion about a horizontal axis. For example, drive unit 48A is not required to provide excessive torque that would be necessary to lift arms 16 and 18, and end effector 22 (and any object thereon), upward in a vertical direction. Thus, by providing arms 14, 16, and 18, and end effector 22 on a side of the vertical motion mechanism 30, torque requirements for each of the drive units are reduced.

Figure 4:
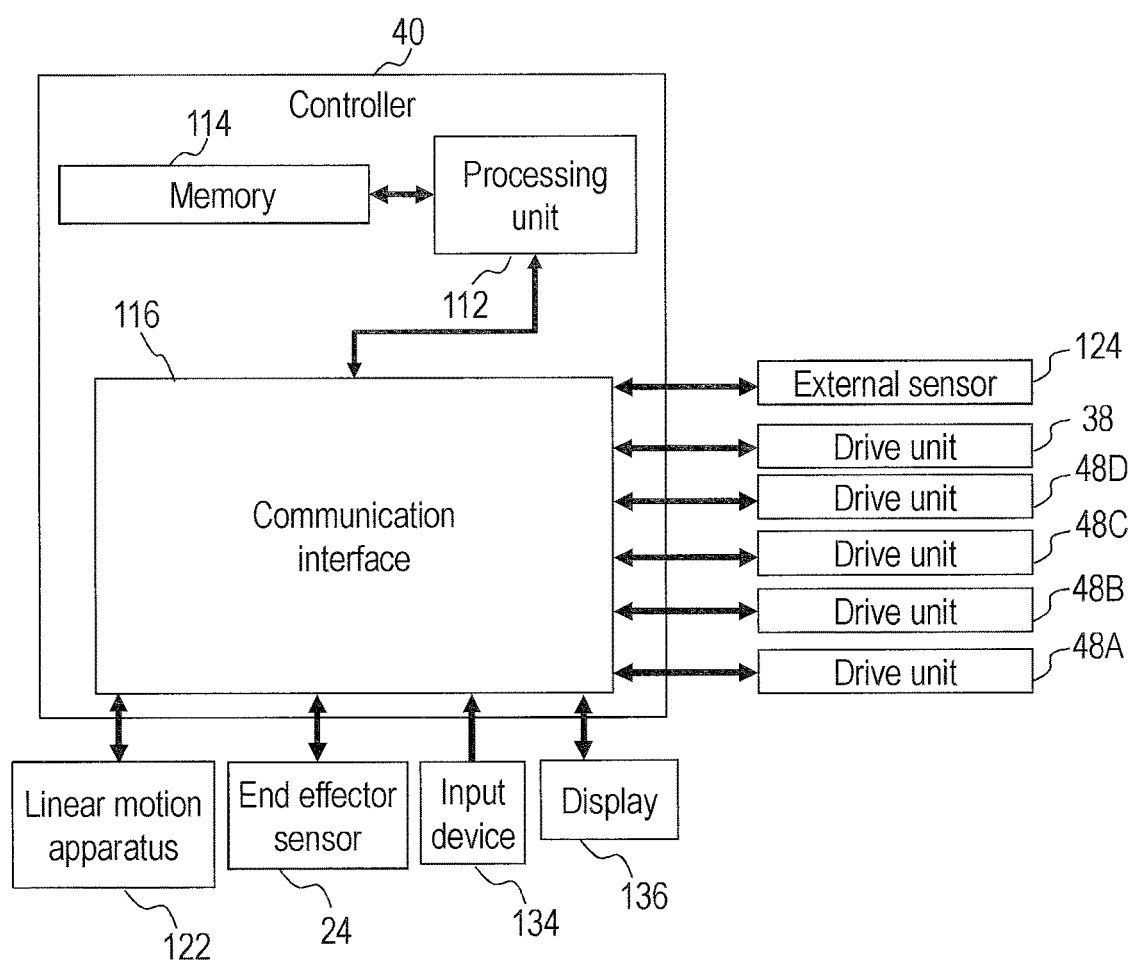
FIG. 4 is a block diagram illustrating a control unit according to an embodiment of the present invention.

FIG. 4 illustrates an exemplary configuration of control unit 40. The operation of the vertical motion drive unit 38, first drive unit 48A, second drive unit 48B, and third drive unit 48C, is controlled by control unit 40. Control unit 40 can also control additional drive units in the same manner, such as drive units 48D, 481A, and 481B, which are discussed below. Control unit 40 includes a single or central processing unit 112 programmed to perform the various functions to bring about motion of manipulator 20 as described herein. Control unit 40 includes a memory device 114 and a communication device formed by communication interface 116 that performs motion control and monitoring functions. Memory device 114 is, for example, a hard disk, solid state storage device, EEPROM, or other non-transitory storage medium capable of long-term storage. The control unit 40 is configured to operate the robotic apparatus 10 as a single, coordinated system, by communicating with linear motion mechanism 122, end effector sensor 24, input device 134, display 136, external sensor 124, and each of the drive units in a wired or wireless manner. Each of the drive units, including drive units 38 and 48A-48C, is configured to provide motion feedback to control unit 40 via communication interface 116.

A user can interact with input device 134, which can include a mouse and/or keyboard, to define a desired transfer operation. Display 136 is configured to display information to the user. Thus, by interacting with input device 134, a user can configure control unit 40 to move robotic apparatus 10 with respect to orientation, location, and operation sequence.

The control unit 40 can be configured to determine a location and orientation of articles W within a work area, by using one or more sensors and/or vision detectors. For example, external sensor 124 provides feedback regarding the position of each of the arms 14, 16, and 18, and the end effector 22, as well as the position of article W. As illustrated in FIG. 3, one or more external sensors 124, as well as sensor 24 on end effector 22, provide position feedback with respect to a plurality of articles W, as well as provide information regarding the position of shelves S.

An exemplary configuration of manipulator 20 of robotic apparatus 10 will now be described with reference to FIG. 5a. Drive units 48A-48C are respectively disposed in arms 14, 16, and 18, and cause second arm 16, third arm 18, and end effector 22 to rotate about respective axes X1, X2, and X3.

End effector 22 includes a support surface 28 to secure article W and support article W against gravity. Grasping device 26 is provided to secure article W by applying a vacuum. A plurality of grasping devices 26 can be successively positioned on end effector 22, especially when grasping device 26 employs suction grasping. Linear motion mechanism 122 is provided on a surface of end effector 22 and causes linear motion of grasping device 26 in order to extend and retract grasping device 26 linearly in horizontal direction B. Linear motion mechanism 122 is a linear motor, for example, capable of precise positioning of grasping device 26. Linear motion mechanism 122 is configured to provide position and force feedback to control unit 40. Force feedback can be used by control unit 40 to determine that an article W has been grasped.

Figure 5A:
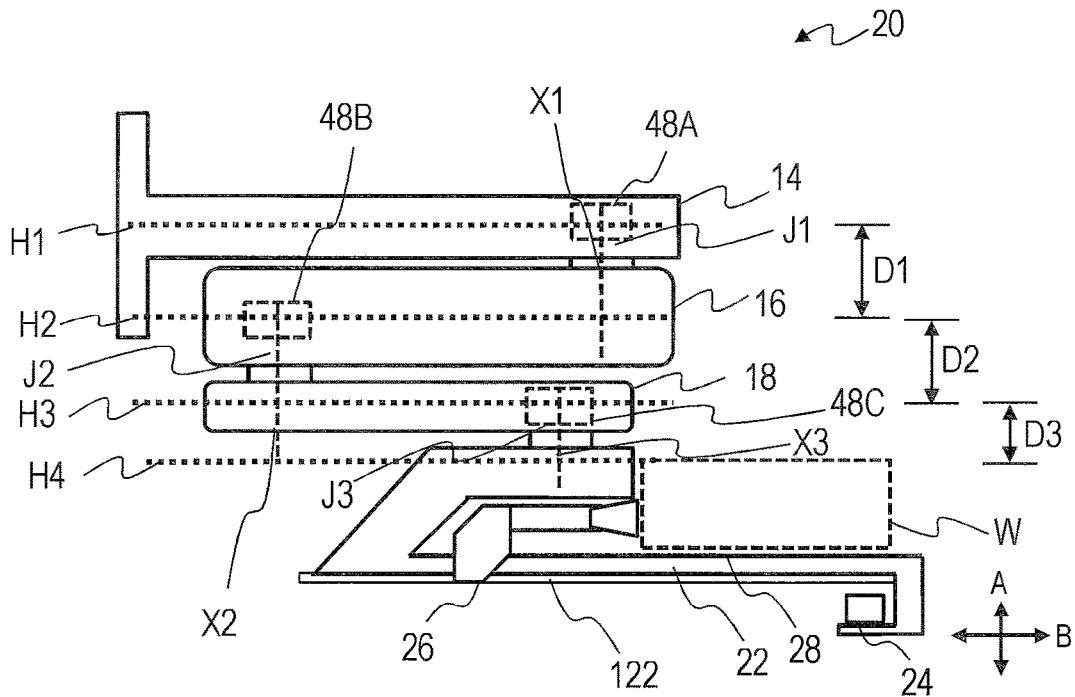
FIGS. 5a and 5b are schematic side views of manipulators according to embodiments of the present invention.

With continued reference to FIG. 5a, first arm 14 is disposed in a first horizontal plane H1. Second arm 16 is disposed in a second horizontal plane H2. Third arm 18 is disposed in a third horizontal plane H3. End effector 22 is disposed within a fourth horizontal plane H4. First and second horizontal planes H1 and H2 are separated by a first distance D1. Second and third horizontal planes H2 and H3 are separated by a second distance D2. Third and fourth horizontal planes H3 and H4 are separated by a third distance D3. The first, second, and third (vertical) distances D1, D2, and D3 can be the same, or different from each other. When the arms 14, 16, 18, and end effector 22 are moved in vertical direction A, the first, second, and third distances D1, D2, and D3 do not change. When drive units 48A-4C are driven to bring about rotational motion of one or more of second arm 16, third arm 18, and end effector 22, the first, second, and third distances D1, D2, and D3 do not change. Thus, throughout the operation of robotic apparatus 10, the distances D1, D2, and D3 between each of the arms and end effector 22 remains constant for every posture achievable by manipulator 20 of robotic apparatus 10. This is because the robotic apparatus allows translational motion along a vertical direction A, which forms a major axis for motion in a vertical plane, and rotation about a plurality of minor axes of motion X1-X3. Furthermore, rotational motion occurs in a plurality of respective horizontal planes H1-H4 that are vertically movable due to vertical motion along vertical direction A. The first arm 14, second arm 16, third arm 18, first drive 48A, second drive 48B, and third drive 48C form a series of successively disposed links and drives for moving the links. Control unit 40 is, for example, a control computer configured to move successively disposed arm units, or links, and drives, and to control the motion of axes. The motion of the axes in accordance with the motion of the corresponding first, second, and third arms 14, 16, and 18, and end effector 22 brings about motion of the robot arm formed by manipulator 20.

Figure 5B:
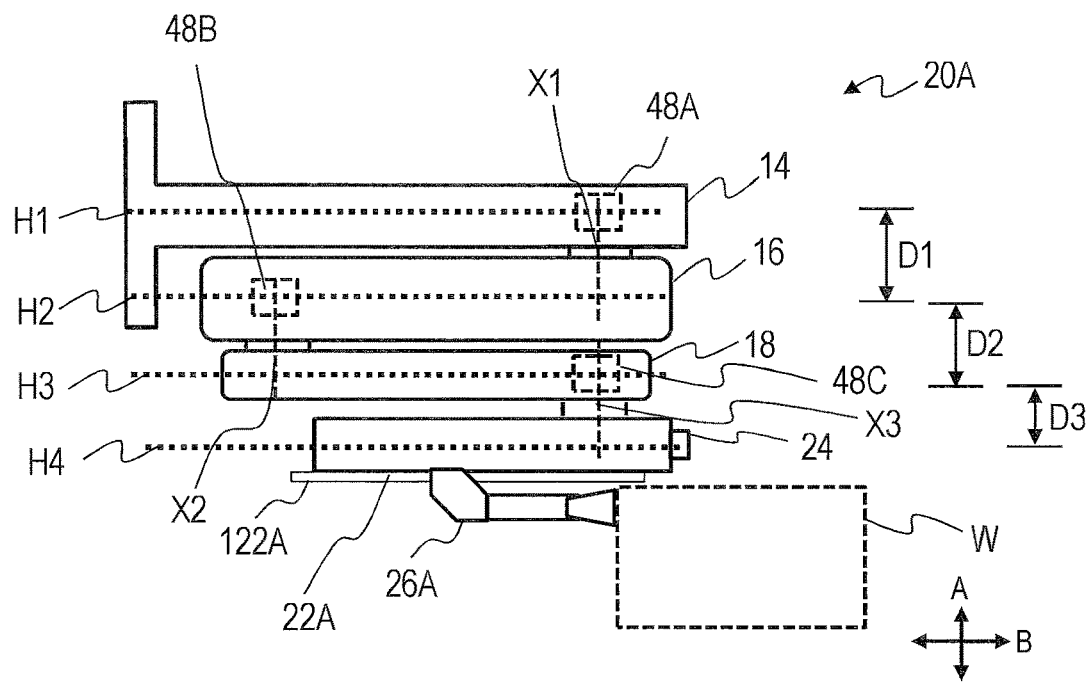

With reference to FIG. 5b, a manipulator 20A can include an end effector 22A that does not have a support surface 28. Manipulator 20A includes a grasping device 26A that is configured to effectively secure article W against gravity by the force of suction or gripping alone, eliminating the need for support surface 28. Grasping device 26A, like grasping device 26, is linearly movable by operation of linear motion mechanism 122A. Sensor 24 is positioned on a side of end effector 22A. In the interest of clarity, the position of revolute joints J1, J2, and J3 is not indicated in FIG. 5b. In manipulator 20A, like manipulator 20, first arm 14 is disposed in first horizontal plane H1, second arm 16 is disposed in second horizontal plane H2, third arm 18 is disposed in third horizontal plane H3, and end effector 22A is disposed in a fourth horizontal plane H4. The distances D1, D2, and D3 between each of the arms and end effector 22 remains constant for every posture achievable by manipulator 20A.

FIG. 6 is a cross-section illustrating a connection between the components of manipulator 20 and the components of vertical motion mechanism 30. First arm 14 is supported by at least one guide 32 slidably connected to rail 34. For example, four guides 32 can be provided. First arm 14 includes a proximal protruding portion 58 connected to nut 86. Nut 86 is coaxially disposed about driven mechanism 36, which is a ball screw, for example. Driven mechanism 36 is driven into rotation by vertical motion drive unit 38. Thus, a rotation of driven mechanism 36 raises and lowers nut 86, proximal protruding portion 58 first arm 14, and all the components of manipulator 20. Alternatively, vertical motion drive unit 38 can be attached to nut 86 and operated to cause nut 86 to rotate relative to a stationary ball screw. Each guide 32 is securely connected to an upper or lower portion of proximal protruding portion 58.

In vertical motion mechanism 30, driven mechanism 36 is rotatably connected to vertical motion drive unit 38. By bringing driven mechanism 36 into rotational motion, nut 86 and first arm 14 are moved upward and downward. Thus, manipulator 20 can be moved in vertical direction A without rotating any of the arms. Even if manipulator 20 is placed in a fully extended posture, manipulator 20 can be raised or lowered without rotating any of the arms and without changing the posture of the manipulator 20.

Figure 7:
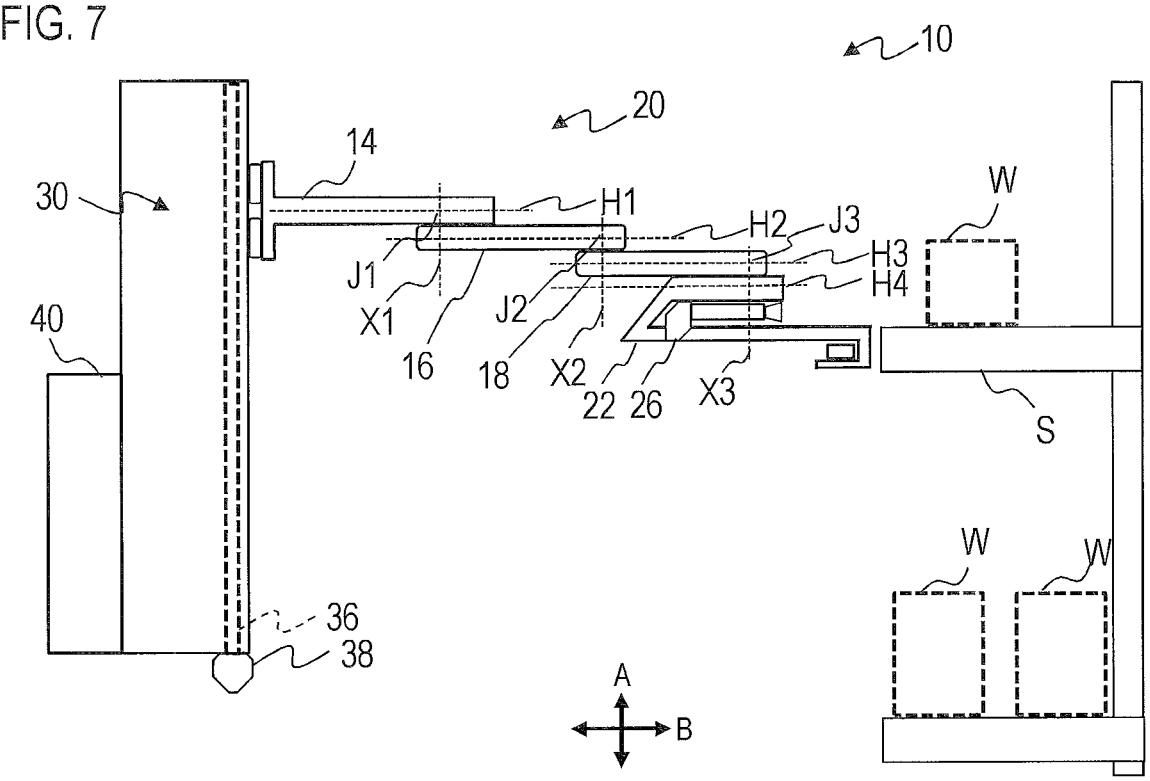
FIG. 7 is a schematic side view illustrating a posture of a manipulator according to an embodiment of the present invention.

FIG. 7 depicts a posture of robotic apparatus 10 in which manipulator 20 is positioned in a vertical position by vertical motion mechanism 30 while first arm 14, second arm 16, and third arm 18 are extended in the horizontal direction B toward an article W on shelf S. As can be seen in FIG. 7, manipulator 20 is movable to a position adjacent to shelf S and article W while the first arm 14, second arm 16, third arm 18, and end effector 22 are each disposed at a side of vertical motion mechanism 30. Thus, by vertical motion of vertical motion mechanism 30 in a vertical direction and revolute motion of second arm 16, third arm 18, and end effector 22 about axes X1, X2, and X3, grasping device 26 can be placed adjacent to an article W at a first origin position. No rotation about a horizontal axis is necessary in order to place manipulator 20 in this position. Rather, an entirety of the arms of robotic apparatus 10 rotate about respective vertical axes to position manipulator 20 at an intended location adjacent to shelf S. Robotic apparatus 10 is configured to achieve a posture in which manipulator 20 is located at a deep position within shelf S to reach an article W located near the end of shelf S most distant from robotic apparatus 10.

Figure 8:
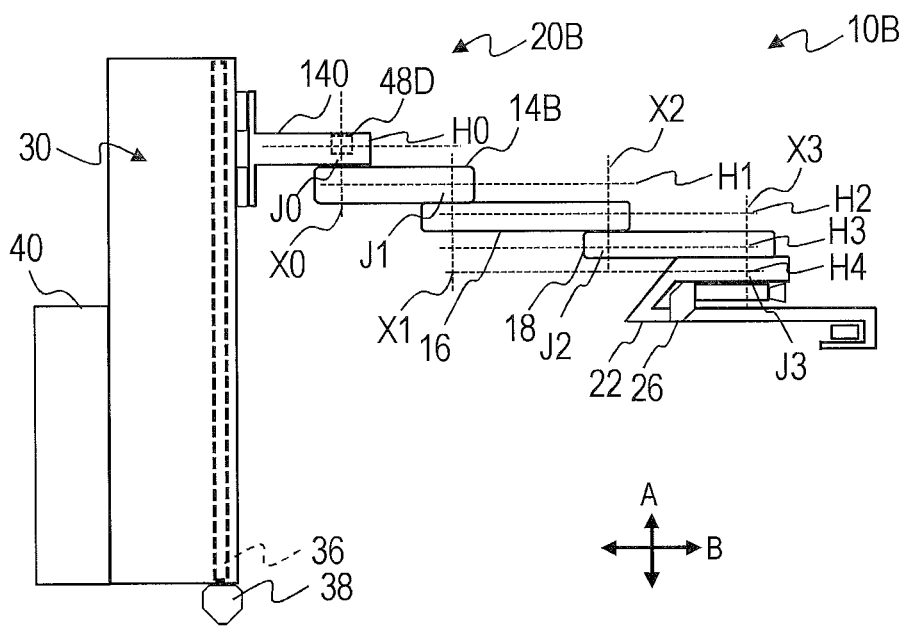
FIG. 8 is a schematic side illustrating another manipulator according to an embodiment of the present invention.

In an embodiment of the invention depicted in FIG. 8, a robotic apparatus 10B includes manipulator 20B having a first arm 14B, which forms an additional pivotable link configured to rotate about axis X0 to allow for greater reach. First arm 14B is connected to vertical motion mechanism 30 via an arm member, support arm 140, and revolute joint J0. First arm 14B is driven to rotate about axis X0 by a drive unit 48D disposed within support arm 140. Thus, manipulator 20B of robotic apparatus 10B has four degrees of freedom allowing for greater reach in narrow shelf spaces and on either side of aisles in a Very Narrow Aisle environment. First arm 14B, second arm 16, and third arm 18 are extended in the horizontal direction in FIG. 8. Vertical distances between each of the arms 140, 14B, 16, 18, and end effector 22 remain constant for every posture achievable by manipulator 20B. In the interest of clarity, drive units 48A-48C, which are respectively disposed within first arm 14B, second arm 16, and third arm 18, are not depicted in FIG. 8.

First arm 14B of manipulator 20B has a range of motion of 180 degrees. The center of the range of motion of first arm 14B coincides with the tucked position in which first arm 14B, second arm 16, third arm 18, and end effector 22 are drawn toward vertical motion mechanism 30 and overlap each other. Thus, from the tucked position, first arm 14B is configured to rotate 90 degrees in a first direction and 90 degrees in an opposite direction. The additional link also provides dexterity for path planning, and increased versatility. The configuration of manipulator 20B in FIG. 8 is particularly advantageous for use in narrow shelf spaces and allows for even greater reach into such shelf spaces and within opposite sides of aisles in a warehouse, for example.

As with robotic apparatus 10, in robotic apparatus 10B, vertical motion mechanism 30 forms a major vertical axis, while manipulator 20B includes minor horizontal link axes that rotate about vertical axes. All of the arm members are located to the side of the vertical motion mechanism 30, regardless of the posture of the support arm 140 first arm 14B, second arm 16, and third arm 18. Any end effector configuration can be employed in manipulator 20, provided that the end effector is capable of transferring article W from a first location to a second location.

FIG. 9 depicts a robotic apparatus 10C having a manipulator 20C that includes first arm 14, second arm 16, and end effector 22. In this embodiment, two drive units 48A and 48B are included. Drive unit 48A causes rotational motion of second arm 16 about vertical axis X1. Drive unit 48B causes rotational motion of end effector 22 about vertical axis X2. First arm 14 is slidably connected to vertical motion mechanism 30 by guides 32. Vertical distances between each of the arms 14 and 16, and end effector 22 remain constant for every posture achievable by manipulator 20C. The omission of a third arm in manipulator 20C reduces manufacturing cost of robotic apparatus 10C. The energy required to operate manipulator 20C is also reduced by the elimination of a drive unit and a weight reduction of manipulator 20C.

As with robotic apparatus 10, in robotic apparatus 10C, vertical motion mechanism 30 forms a major vertical axis, while manipulator 20C includes minor horizontal link axes that rotate about vertical axes. All of the arm members are located to the side of the vertical motion mechanism 30, regardless of the posture of the first arm 14 and second arm 16. Any end effector configuration can be employed in manipulator 20C, provided that the end effector is capable of transferring article W from a first location to a second location.

FIG. 10 depicts a robotic apparatus 10D including a manipulator 20D according to an embodiment of the invention. Manipulator 20D is an example of a four-bar link manipulator, and robotic apparatus 10D is an example of a four-bar link robotic apparatus. Manipulator 20D is secured to guides 32 by a mounting bracket 92. Mounting bracket 92 is secured to bottom and/or lower surfaces of manipulator base 154. Four arms, 14D, 16D1, 16D2, and 18D are connected to manipulator housing 152. A pair of drive units 481A and 481B are coaxially disposed inside manipulator housing 152. Drive unit 481A causes a rotation of first arm 14D about axis X1A. Drive unit 481B causes a rotation of second arm 16D1 about axis X2A. Axis X1A and axis X2A are coincident with each other. Thus, first arm 14D and second arm 16D1 are active arms that are directly brought into revolute motion by drive units 481A and 481B. A pair of joints for first arm 14D and active second arm 16D1 are disposed within housing 152. Thus, portions of first arm 14D and active second arm 16D1 extending within housing 152 establish revolute joints J1D and J2D. Motion of a passive second arm 16D2 causes rotation of third arm 18D about axis X3A. Vertical distances between each of the arms 14D, 16D1, 16D2, 18D, and end effector 22 remain constant, for every posture achievable by manipulator 20D. As can be seen in FIG. 10, end effector 22 and/or sensor 24 can be disposed on a distal surface or a lower surface of third arm 18D.

Figure 11:
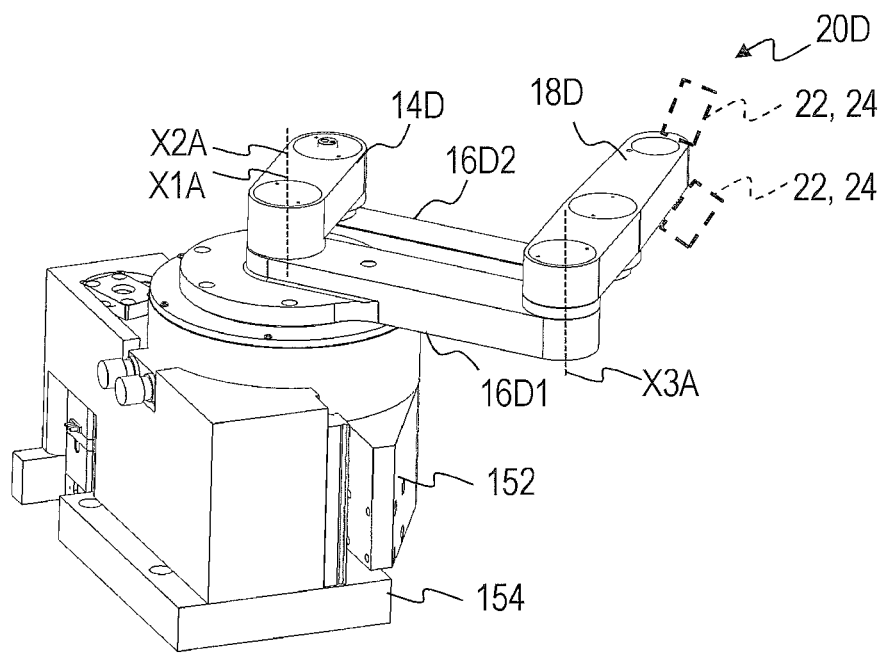
FIG. 11 is a perspective view of a four-bar link manipulator according to an embodiment of the present invention.

FIG. 11 is a perspective view of manipulator 20D. As can be seen in FIG. 11, driven arms are formed by first arm 14D and second arm 16D1. A passive second arm 16D2 is connected to a distal end portion of first arm 14D. A passive third arm 18D is connected to a distal end portion of active second arm 16D1 and a distal end portion of passive second arm 16D2. Through a motion of active arms first arm 14D and second arm 16D1, passive arms second arm 16D2 and third arm 18D are brought into motion to place end effector 22 in a desired position. The four-bar link structure of manipulator 20D minimizes the inertia of the manipulator 20D while providing reach within all corners of a shelf S.

As with robotic apparatus 10, in robotic apparatus 10D, vertical motion mechanism 30 forms a major vertical axis, while manipulator 20D includes minor horizontal link axes that rotate about vertical axes. All of the arm members are located to the side of the vertical motion mechanism 30, regardless of the posture of the first arm 14D, active second arm 16D1, passive second arm 16D2, and third arm 18D. Any end effector configuration can be employed in manipulator 20D, provided that the end effector is capable of transferring article W from a first location to a second location.

Figure 12:
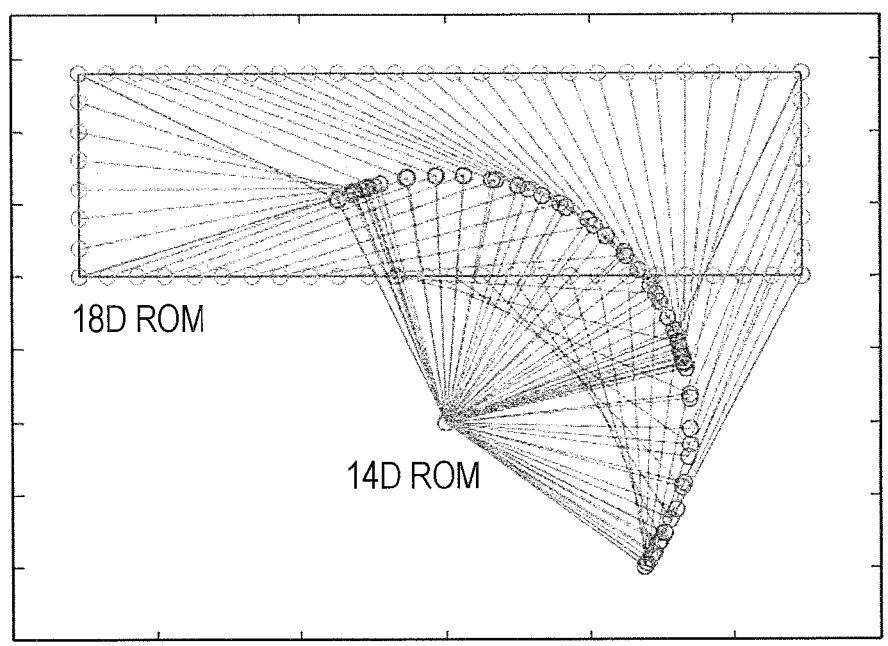
FIG. 12 is a chart depicting a range of motion of a four-bar link manipulator according to an embodiment of the present invention.

FIG. 12 illustrates a range of motion of active arm 14D, (14D ROM) and a range of motion of third arm 18D (18D ROM) of manipulator 20D. As can be seen in FIG. 11, revolute motion of active arm 14D by drive unit 481A causes motion of passive second arm 16D2, and a rotational motion of third arm 18D about axis X3A. Revolute motion of active second arm 16D1 by drive unit 481B causes translational motion of passive third 18D. Thus, drive units 481A and 481B achieve the range of motion illustrated in FIG. 12 by the configuration illustrated in FIGS. 10 and 11. The range of ability to place end effector 22 within the range of motion indicated by 18D ROM, and subsequently extend grasping device 26 towards an article W, ensures that all positions of a warehouse shelf S are reachable.

Figure 13A:
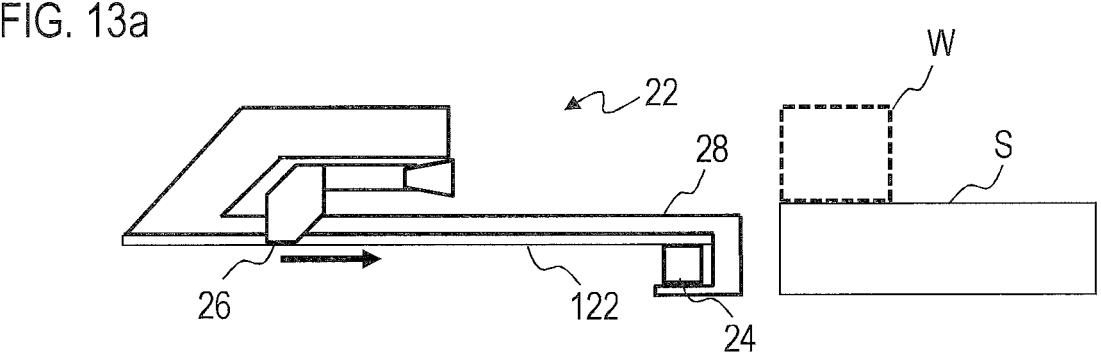
FIGS. 13a-13d are schematic side views illustrating an operation of an end effector according to an embodiment of the present invention.
Figure 13B:
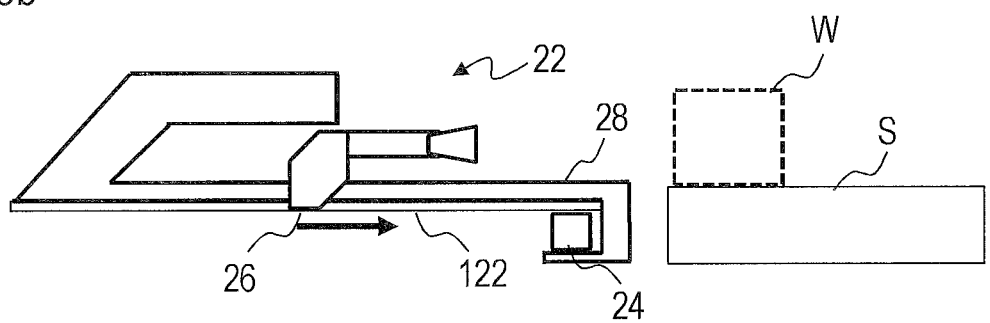
Figure 13C:
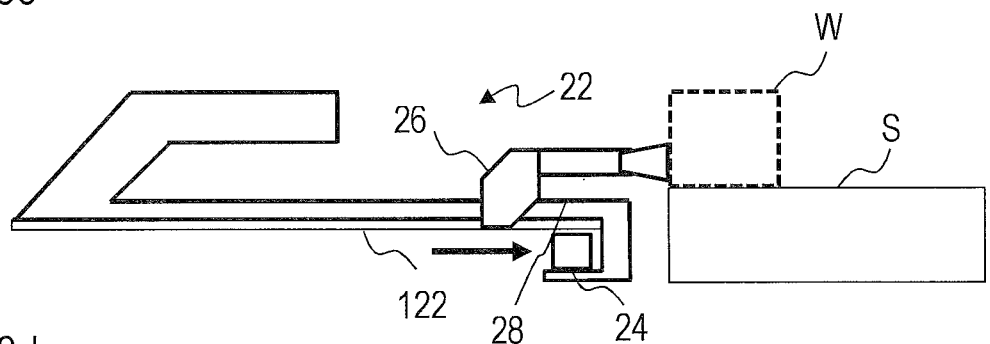
Figure 13D:
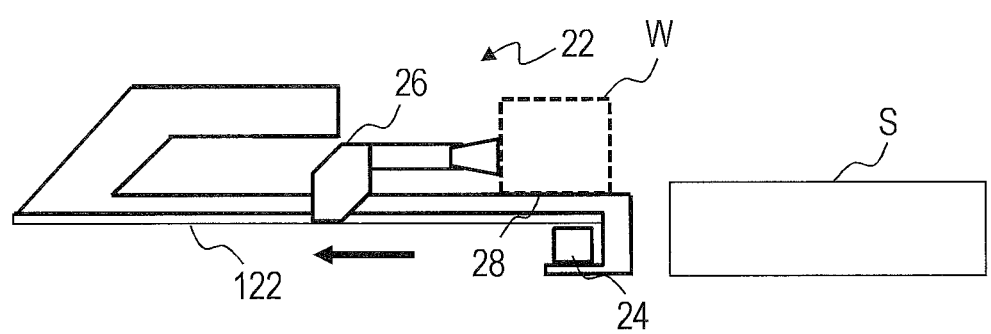

FIGS. 13a-13d illustrate an operation of end effector 22 when grasping an article W located on the surface of a shelf S. Throughout the grasping operation of end effector 22 in FIGS. 13a-13d, manipulator 20 maintains a single orientation. In FIG. 13a, control unit 40 has placed first arm 14, second arm 16, and third arm 18 in a position adjacent to article W. The distance between end effector 22 and shelf S is detected by sensor 24. Subsequently, linear motion mechanism 122 is activated to bring grasping device 26 into linear motion in a horizontal direction while providing position and torque feedback to control unit 40. Once grasping device 26 comes into contact with a surface of article W as depicted in FIG. 13c, an increase in force is detected in the feedback provided by linear motion mechanism 122. At this time, control unit 40 determines that article W is in contact with grasping device 26. Then, in FIG. 13d, linear motion mechanism 122 retracts grasping device 26, which grasps article W through the force of suction. Article W is drawn to support surface 28. Once article W is secured on support surface 28, or secured by grasping device 26 on an end effector 22 without support surface 28, the first arm, 14, second arm 16, third arm 18, and end effector 22 are driven to a second position at which the movement depicted in FIGS. 13a-13d is reversed to place article W at a destination position.

In FIGS. 13a-13d, the manipulator 20 and components of end effector 22 other than grasping device 26 are able to maintain a single position relative to the shelf. Thus, during the process of grasping article W, there is no need to instruct any of the drive units to change the positions of arms 14, 16, 18, or end effector 22. Vertical motion mechanism 30 can be activated during before, during, or after the process of FIGS. 13a-13d without affecting the orientation of end effector 22 and grasping device 26. Only linear motion mechanism 122 needs to be activated to extend grasping device 26 and withdraw grasping device 26. Thus, there is no potential interference between the robotic apparatus and the shelf S, or other surrounding obstacles. While FIGS. 13a-13d illustrate an article W located at a relatively shallow position in shelf S, the robotic apparatus and manipulator 20 are able to place end effector 22 at deep locations and within all corners of shelf S without interference between arms or with the shelf S. Manipulator 20 is configured to main a single orientation across the entire shelf S, even when reaching to deep locations within the shelf S, especially when used in a VNA or VNS environment.

Figure 14A:
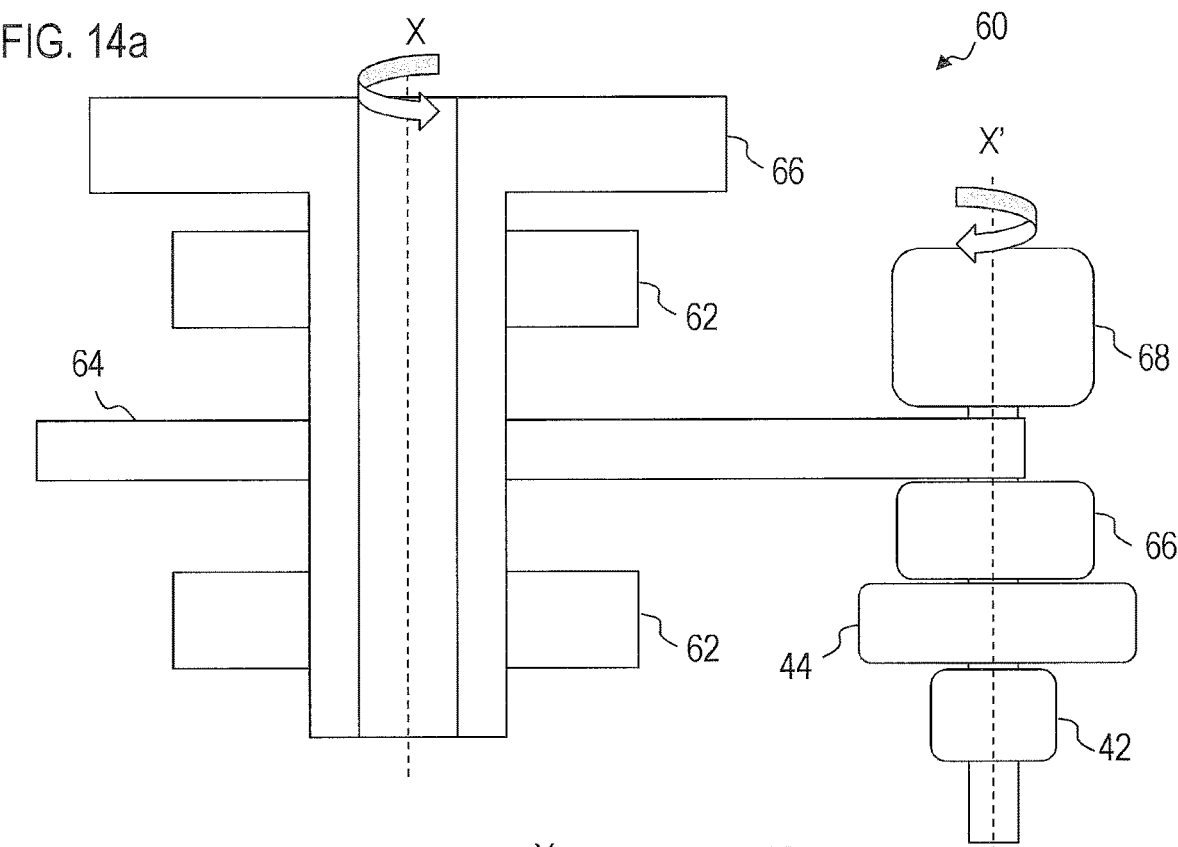
FIG. 14a is a partial cross-sectional view of a drive unit according to an embodiment of the present invention.

FIG. 14a illustrates a configuration of a drive unit 60 that can be employed for each of the drive units discussed herein, including drive units 38, 48A-48D, 481A, and 481B, according to an exemplary embodiment. As depicted in FIG. 14a, a drive unit 60 having an indirect motor arrangement selectively rotates a load 66 about a pivot axis X in a clockwise and counterclockwise direction. The load 66 is secured by between bearings 62. A drive gear 64 imparts rotation to load 66 according to the activation of motor 44, which includes a rotor and a stator. As depicted in FIG. 14a a rotation direction about an axis X' imparts an opposite rotation to load 66 about axis X. Commutation encoder 42 detects the angular position of motor 44 about an axis X', which is connected to drive gear 50 via a reduction gearbox 46. The angle sensor 68 detects the rotational position of drive gear 50 in accordance with the operation of motor 44 and reduction gearbox 46. Commutation encoder 42 and angle sensor 68 provide control unit 40 with position feedback regarding the position of motor 44 and load 66.

Figure 14B:
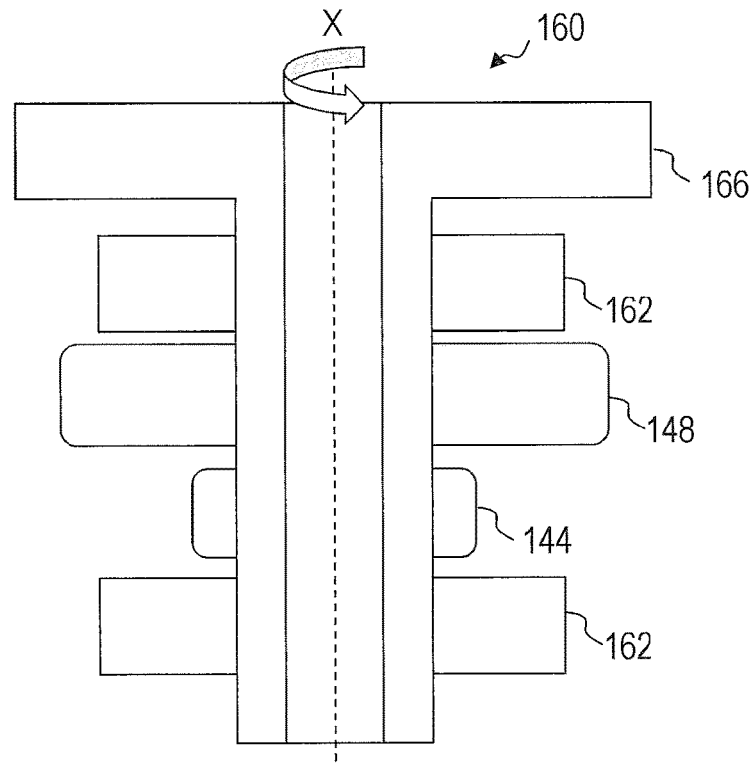
FIG. 14b is a partial cross-sectional view of another drive unit according to an embodiment of the present invention.

FIG. 14b illustrates a configuration of a drive unit 160 that can be employed for each of the drive units discussed herein, including drive units 38, 48A-48D, 481A, and 481B, according to an exemplary embodiment. FIG. 14b depicts a drive unit 160 having a direct drive arrangement that selectively rotates load 166 in the clockwise and counterclockwise directions about pivot axis X. The load 166 is secured between bearings 162, which are coaxially disposed with load 166 about pivot axis X. However, bearings 162 can be omitted if desired. Angle sensor 148 is located between bearings 162 in an axial direction along pivot axis X. The angle sensor 148 detects the position of motor 144 and provides position feedback to control unit 40. Angle sensor 148 is disposed adjacent to motor 144 in the axial direction. Angle sensor 148 can be located in other axial positions, provided that it is capable of sensing a position of motor 144 and/or load 166. Motor 144 includes a rotor and a stator and is constituted by a servo motor, for example. The rotor of motor 144 is connected to load 156. The rotor and stator of motor 144 are coaxially disposed about pivot axis X.

As illustrated in FIG. 14b, the direct drive arrangement 160 does not require a reduction gearbox or a commutation encoder. Furthermore, the direct drive arrangement of drive unit 160 provides a more compact configuration. The direct drive arrangement of drive unit 160 provides the ability to sense motor torque, position, and velocity to manage load inertia, optimize trajectory, and reduce a total cycle time needed to transfer an article W from a first position to a second position.

Figure 15A:
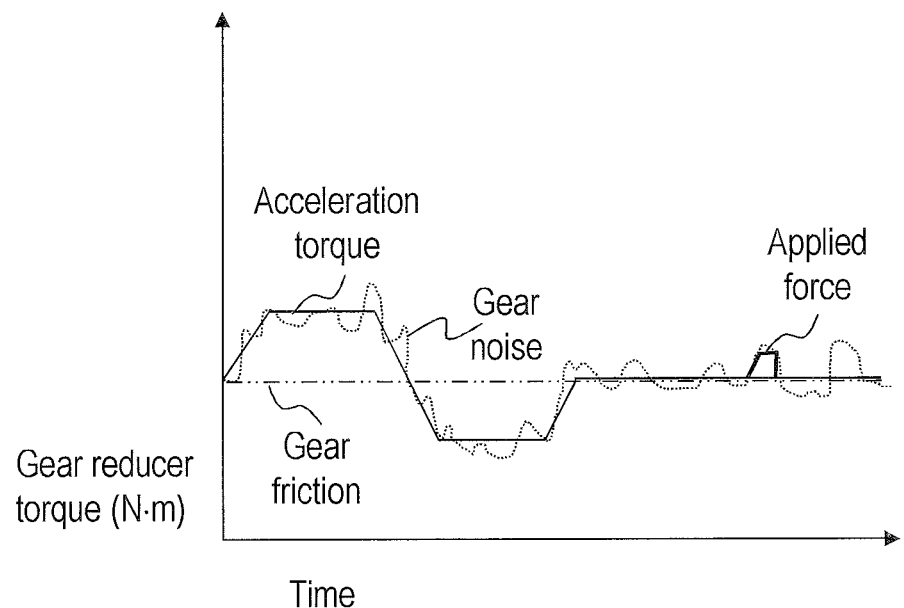
FIGS. 15a and 15b are charts depicting exemplary operating conditions of drive units according to an embodiment of the present invention.

FIG. 15a illustrates a chart demonstrating an exemplary operation of a drive unit 60 corresponding to the configuration of FIG. 14a. FIG. 15a depicts an exemplary acceleration torque commanded by control unit 40 during control of drive unit 60. Due to the presence of gearing such as drive gear 64, gear noise and gear friction occur. FIG. 15a illustrates a gear reduction of 5:1, for example. Due to the gear noise and gear friction, an applied force applied according to the operation of the motor is reduced.

Figure 15B:
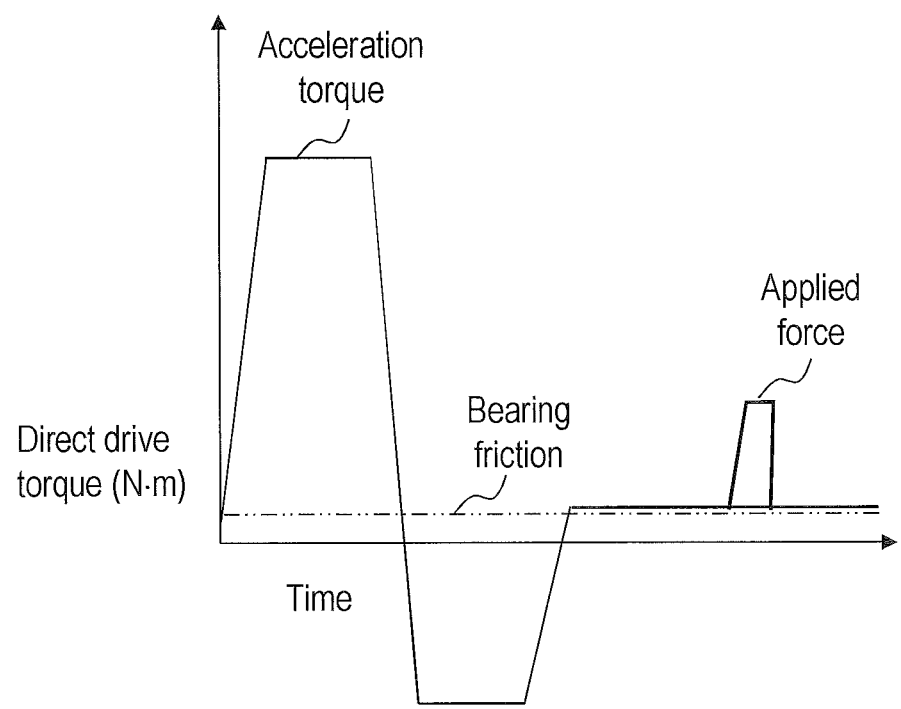

FIG. 15b illustrates a chart demonstrating an exemplary operation of drive unit 160 corresponding to a direct drive configuration as depicted in FIG. 14b. As can be seen, drive unit 160 is capable of increased acceleration torque and applied force as a gear reducer is not necessary. The torque sensing ability of drive unit 160 allows for torque, position, and velocity feedback. This direct feedback improves the ability of control unit 40 to manage inertia of load 166 and accordingly provide a smoother trajectory for robotic apparatus 10. This minimizes the risk of collisions and reduces total cycle time due to the improved movement of robotic apparatus 10 when direct drive units 160 are used for one or more of the drive units 38, 48A-48D, 481A, and 481B.

FIGS. 16a-16c illustrate exemplary configurations of vertical motion mechanisms usable in each robotic apparatus described herein. As illustrated in FIGS. 1 and 6, vertical motion mechanism 30 can be provided with a single vertical motion drive unit 38 that rotates a ball screw 84. Vertical motion mechanism, as depicted in FIGS. 1 and 6, can alternatively be provided with a servomotor that rotates nut 86 to form a driven mechanism. FIGS. 16a-16c are schematic cross sectional views of configurations of vertical motion mechanisms 30A-30C, which can be employed to reduce the demands placed on the drive units in the vertical motion mechanism, according to exemplary embodiments of the invention. As illustrated in FIGS. 16a-16c, vertical motion mechanisms 30A-30C each include a series of carriages C1, C2, and C3 connected in series. Carriage C1 is secured to the ground. Carriage C2 forms an intermediate first moving carriage, while carriage C3 forms a second moving carriage. Manipulator 20 is mounted to a side of carriage C3 in the horizontal direction.

Vertical motion mechanism 30A in FIG. 16a includes a pair of ball screws 84 disposed within first carriage C1 and second carriage C2. Vertical motion drive unit 38 is disposed within the second carriage C2 and causes a rotation of ball screw 84. This rotation drives rotating nut 86 in first carriage C1 and rotating nut 86 in second carriage C2 to each move in a translational manner upward and downward in the vertical direction. The rotation of ball screw 84 in second carriage C2 (an exemplary driven mechanism) also causes rotation of rotating nut 86 (an exemplary driven mechanism) in first carriage C1, which is connected to ball screw 84 of second carriage C2 by a pulley and belt 82. Second carriage C2 is movably secured to first carriage C1, while third carriage C3 is moveably secured to second carriage C2.

Due to the rotation, by pulley and belt 82, of ball screw 84 and rotating nut 86 in the first carriage C1, second carriage C2 moves in vertical direction A according to the movement of rotating nut 86 of first carriage C1 in the vertical direction A. Due to the serial connection of first carriage C1, second carriage C2, and third carriage C3, actuation of vertical motion drive unit 38 raises second carriage C2 by a distance Z1 in vertical direction A, and raises third carriage C3 by a distance Z2 in vertical direction A. In the example illustrated in FIG. 16a, a ratio of distance Z2 to distance Z1 is 2:1. However, any desirable ratio is possible.

FIG. 16b illustrates a modified vertical motion mechanism 30B according to an exemplary embodiment. Vertical motion mechanism 30B also includes a first carriage C1, second carriage C2, and third carriage C3. Vertical motion drive unit 38 is disposed within first carriage C1. A ball screw 84 (an exemplary driven mechanism) is driven into rotational motion by vertical motion drive unit 38, which in turn causes vertical motion of nut 86 and second carriage C2. A steel band 94 is secured to the ground or a secure surface on a first end by first carriage C1. The opposite end of steel band 94 is connected to third carriage C3. As the second carriage C2 is lifted and brought into motion in vertical direction A by distance Z1, third carriage moves C3 moves distance Z2. While in FIG. 16b, the ratio of distance Z2 to distance Z1 is 2:1. However, any desirable ratio is possible. Pulley 96 (an exemplary driven mechanism) supports steel band 94 and rotates according to the motion of steel band 94 to raise and lower third carriage C3.

FIG. 16c illustrates another modified vertical motion mechanism 30C according to another exemplary embodiment. The vertical motion mechanism 30C includes drive unit 98 configured to rotate pulley 196 on first carriage C1. Indirect drive arrangement 60 with gear reduction or direct drive arrangement 160 without gear reduction is employed in drive unit 98, which is a high torque servo motor configured to drive the vertical axis achieved by vertical motion mechanism 30C. A steel band 194 connects second carriage C2 to first carriage C1 such that rotation of pulley 196 of the first carriage C1 moves second carriage C2 in vertical direction A. As steel band 194 lifts second carriage C2 by a distance Z1, pulley 96 (an exemplary driven mechanism) moves in vertical direction A and causes third carriage C3 to move by distance Z2 in vertical direction A. A possible ratio of distance Z2 to distance Z1 is 2:1, while any desired ratio is possible. Advantageously, the configuration of vertical motion mechanism 30C eliminates the need for a ball screw lift mechanism.

In each of the vertical motion mechanisms 30A-30C depicted in FIGS. 16a-16c, manipulator 20 can be mounted to rails 34 by guides 32 in the manner described previously. Vertical motion mechanisms 30A-30C can be used in robotic apparatus 10 without a base, or robotic apparatus 10A with base 52, for example.

Exemplary stages of article transportation are illustrated in FIGS. 17a-17d. In each of FIGS. 17a-17d, a working envelope 190 of robotic apparatus 10 is illustrated as a shaded region. As can be seen in each of FIGS. 17a-17d, the working envelope 190 of robotic apparatus fully covers two shelves S (each configured as Very Narrow Shelves, for example) located on opposite sides of robotic apparatus. There is no arm or end effector that rotates about a horizontal axis, and robotic apparatus 10 is configured to have a small form factor. Thus, manipulator 20 can extend to the corners of the shelves S without interference, while the manipulator 20 maintains a single orientation across an entirety of shelf S. Working envelope 190 also entirely covers cart 120 located in an aisle (Very Narrow Aisle) front of robotic apparatus 10. Advantageously, the robotic apparatus 10 is able to place articles W as desired without interference, when operating in a Very Narrow Aisle or a Very Narrow Shelf environment, and while maintaining a small form factor.

Figure 17A:
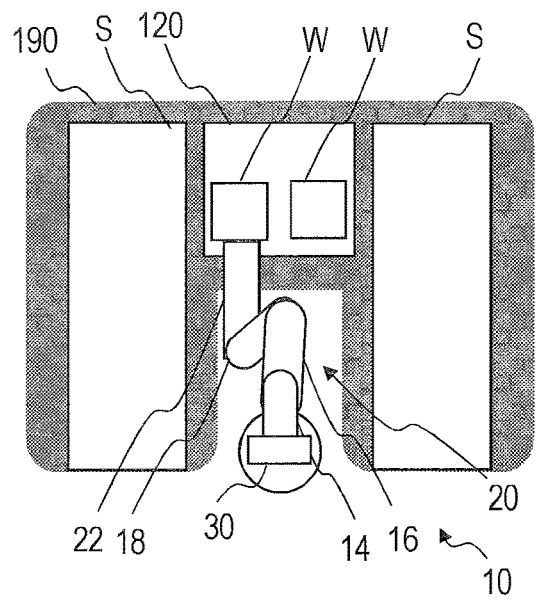
FIGS. 17a-17d are schematic top views illustrating an operation of a robotic apparatus according to an embodiment of the present invention.
Figure 17B:
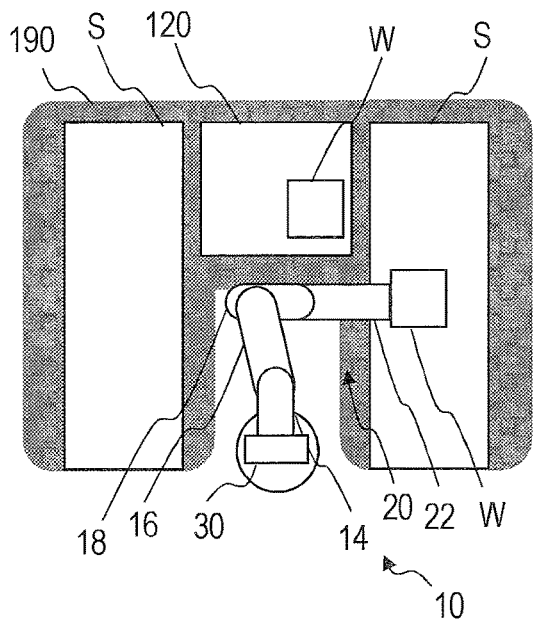
Figure 17C:
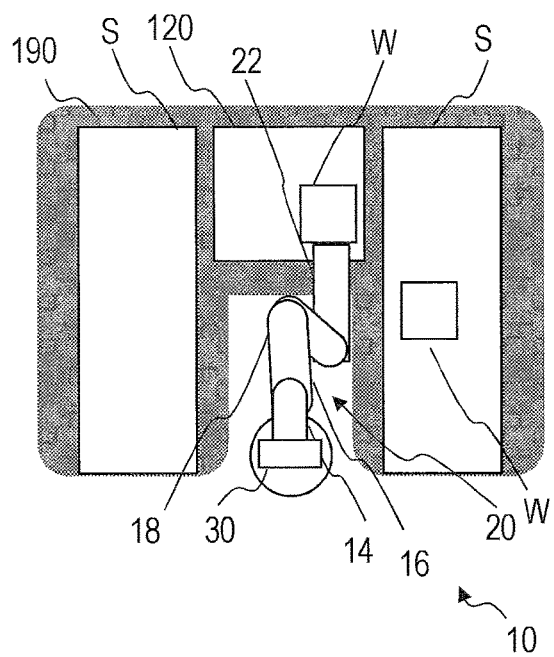
Figure 17D:
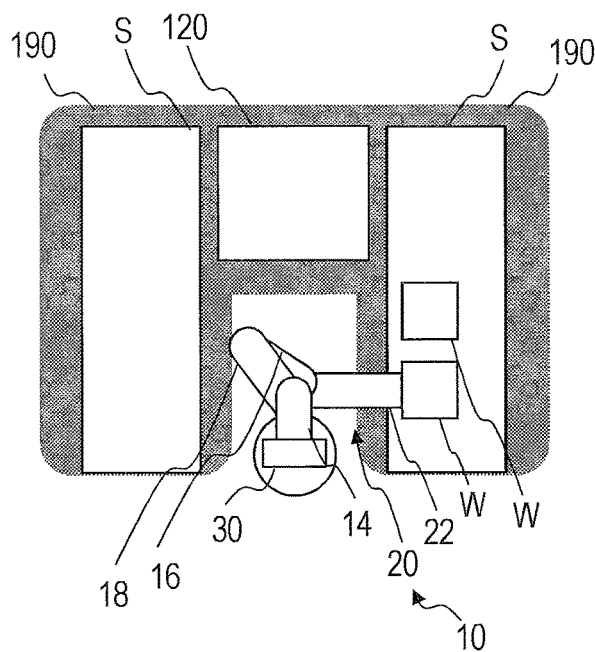

As depicted in FIG. 17a, robotic apparatus 10 is able to place end effector 22 in a position adjacent to an article W at a first, or origin, position. As depicted in FIG. 17a, the first arm 14, second arm 16, third arm 18, and end effector 22 are placed in a posture at which article W can be grasped without interfering with cart 120 or one of the shelves S. FIG. 17b depicts a placement of this article W at a second, or destination, position on one of the shelves S. FIG. 17c illustrates robotic apparatus 10 in a posture that places end effector 22 in a position adjacent to a second article W located at a first position. As in FIG. 17a, the position of first arm 14, second arm 16, third arm 18, and end effector 22 do not interfere with one of the shelves S or with cart 120, even when the robotic apparatus 10 is employed in a very narrow environment, such as a VNA or VNS environment. End effector 22 is configured reach across an entirety of shelf S or cart 120 while each of the arms of manipulator 20, or manipulators 20A-20D, maintains a single orientation. FIG. 17d illustrates the placement of second article W in a position adjacent to the first article W such that both articles are located at respective second positions.

Vertical motion mechanism 30 can be mounted to a support structure as described with respect to robotic apparatus 10 and FIG. 1, or supported by a housing 52 and a base 54 as described with respect to robotic apparatus 10A and FIG. 2, for example. The working envelope 190 depicted in FIGS. 17a-17d can be effectively doubled by providing a rotational base, as discussed below.

FIGS. 18-21 depict robotic handling systems according to an exemplary embodiment. As will be clear from the discussion of FIGS. 18-21, by providing a plurality of axes of motion and at least one end effector in manipulator 20, the mobility and versatility of the robotic handling apparatus may be used to transport items in a variety of warehouse, and other environments where automated article transfer is desired, including VNS and VNA environments. Further, by equipping a plurality of robotic handling devices with the ability to work either in close proximity or in tandem, robotic handling devices may be used to transport articles as required in manufacturing, warehouse, and other distribution environments. In the interest of simplicity of drawing, individual arms of manipulator 20 are not labelled in FIGS. 18-21. Any robotic apparatus or manipulator described herein can be employed in the robotic handling systems discussed with respect to FIGS. 18-21. Furthermore, any end effector useful to grasp an article W can be used in the robotic handling systems and robotic apparatuses discussed with respect to FIGS. 18-21.

Figure 18:
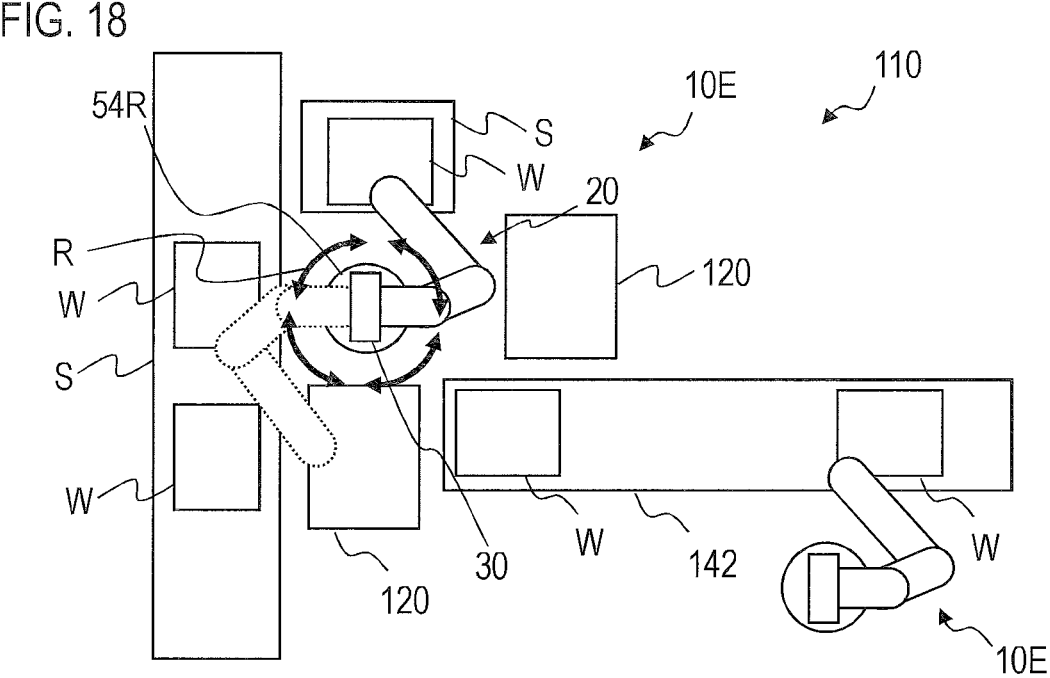
FIG. 18 is a schematic top view of a robotic handling system according to an embodiment of the present invention.

FIG. 18 depicts an exemplary embodiment of a robotic handling system 110 according to an exemplary embodiment. The robotic handling system 110 includes at least one robotic apparatus 10E which is configured a manner similar to robotic apparatus 10. Robotic apparatus 10E is mounted on a rotatable base 54R which allows for the rotation of vertical motion mechanism 30 with manipulator 20 about a vertical axis. Rotatable base 54R includes a drive unit configured to selectively rotate vertical motion mechanism 30 and manipulator 20 of robotic apparatus 10E in a direction R in both a clockwise and counter-clockwise direction according to instructions from control unit 40. Alternatively, rotatable base 54R can bring manipulator 20 into rotation in direction R by manual interaction. Rotation of rotatable base 54R provides manipulator 20 with access to a shelves S of various sizes, a plurality of carts 120, and conveyor 142, while maintaining the ability to reach to the corners of the shelf without interference, regardless of the vertical position of manipulator 20. The rotation of rotational base 54R allows manipulator 20 of robotic apparatus 10E to access articles W located behind manipulator 20 prior to rotation. This rotation approximately doubles the working envelope 190 of robotic apparatus 10E. For example, by rotating rotatable base 54R, manipulator 20 is moved from a position facing a cart 120 to a position facing an elongated shelf S upon which two articles W are located. An exemplary position before rotating is drawn in solid lines, while an exemplary position after rotation is illustrated in phantom. Rotatable base 54R is capable of positioning manipulator 20 at any desired rotational position relative to the vertical direction. Manipulator 20 can secure an article W during rotation, thereby increasing the distance articles W can be transported. Furthermore, by including manipulator 20 with arms that do not rotate about a horizontal axis, power requirements are minimized.

Robotic handling system 110 is advantageously provided with a plurality of robotic apparatuses, as illustrated in FIG. 18. Each robotic apparatus is configured to work either in close proximity or in tandem with other robotic apparatuses. Thus, cooperative, coordinated actions of the robotic apparatuses 10E pick up or acquire articles W, transport or move the articles W between respective positions, and drop off or release the articles W. Thus, articles W can be transferred between various robotic apparatuses 10E. For example, a first robotic apparatus 10E can place an article W on conveyor 142, where it is transported to a proximity of a second robotic apparatus 10E, which picks up the article W, rotates, and places the article W on a shelf S located behind the conveyer 122 and the second robotic apparatus 10E. Thus, productivity is further increased.

As with robotic apparatus 10, in robotic apparatus 10E, vertical motion mechanism 30 forms a major vertical axis, while manipulator 20 includes minor horizontal link axes that rotate about vertical axes. All of the arm members are located to the side of the vertical motion mechanism 30, regardless of the posture of the first arm 14, second arm 16, and third arm 18, or the rotation of rotatable base 54R. Any end effector configuration can be employed in manipulator 20, provided that the end effector is capable of transferring article W from a first location to a second location.

Figure 19:
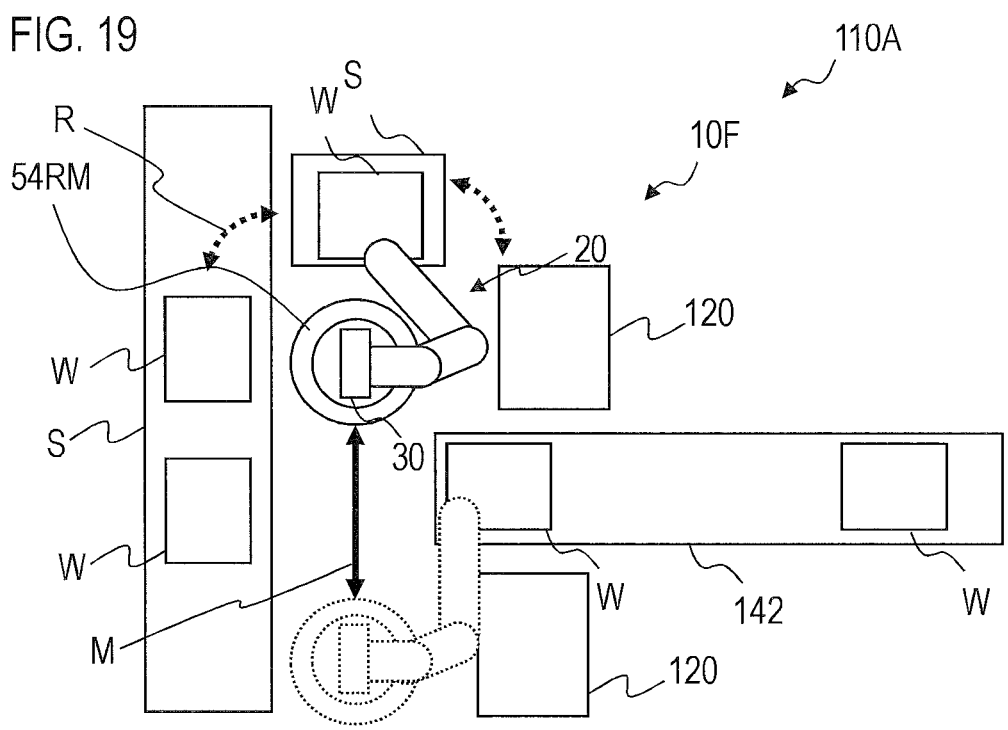
FIG. 19 is a schematic top view of another robotic handling system according to an embodiment of the present invention.

FIG. 19 depicts a robotic handling system 110A which includes at least one robotic apparatus 10F having a mobile base or platform that is manually-operated or automated in accordance with an exemplary embodiment. Robotic handling system 110 is advantageously provided with a plurality of robotic apparatuses to increase productivity. Robotic apparatus 10F includes a mobile rotatable base 54RM upon which manipulator 20 and vertical motion mechanism 30 are rotatably secured. Mobile rotatable base 54RM is a mobile support platform, for example, and is movable in any direction in order to place robotic apparatus 10F and manipulator 20 in a desired location. Mobile rotatable base 54RM can be autonomously controlled by control unit 40, for example, or manually moveable. Mobile rotatable base 54RM is also configured to rotate in the same manner as rotatable base 54R. As with robotic apparatus 10E, manipulator 20 of robotic apparatus 10F is configured to secure an article W during rotation along direction R and to lift or lower article W before during or after rotation. Manipulator 20 of robotic apparatus 10F can also secure article W during motion of mobile rotatable base 54RM, allowing the robotic apparatus 10F to perform tasks while the mobile rotatable base 54RM is in motion. Robotic apparatus 10F is depicted in a first position, or first station, in FIG. 19, indicated by solid lines. Robotic apparatus 10F is movable to a second position, or second station, by moving along path M to a second position illustrated by phantom lines in FIG. 19. An article W can be secured during this motion. Thus, robotic apparatus 10F is movable between a wide variety of locations within a workspace. By moving between a plurality of stations, robotic apparatus 10F with a mobile base can be deployed in a multi-station storage and retrieval system (MSRS). While mobile rotatable base 54RM is rotatable in the example depicted in FIG. 19, base 54RM can also be provided without the ability to rotate.

Robotic apparatus 10F can move along path M, for example, by providing a track to which mobile rotatable base 54RM is connected such that robotic apparatus 10F is selectively movable between a plurality of positions along the track. While path M is a linear path in FIG. 19, any shape for the path M followed by robotic apparatus 10F is possible. Relatively long paths can be employed when robotic apparatus 10F is required to move from a position or station at one end of a warehouse to a position or station at an opposite end of the warehouse, for example. When mobile rotatable base 54RM is configured as a wheeled support platform, a working range of robotic handling apparatus 10F is enlarged even further. Mobile rotatable base 54RM can be provided with a plurality of omnidirectional wheels and corresponding drives for driving the omnidirectional wheels, for example. The drives for the omnidirectional wheels can be controlled by control unit 40, providing autonomous operation of robotic apparatus 10F to move between various locations within a workspace, autonomously grasp a workpiece at a first location, and autonomously place the workpiece at a second location. Robotic apparatus 10F can be used at stations with various configurations of carts 120, conveyors 142, shelves S, or storage systems to store and retrieve articles W. One or more drives provided within the mobile rotatable base 54RM drives a motion of the wheels in the base 54RM.

The robotic handling apparatus 10F of FIG. 19 includes a plurality of successively disposed links, and drives for moving the links, as described previously with respect to manipulator 20, for example. Robotic handling apparatus 10F can be used with a wheeled support base, or a robotic apparatus 10F can be provide without a wheeled support base, as depicted in FIG. 18. Robotic handling apparatus 10F and robotic handling apparatus 10E each include at least one drive configured to direct motion of manipulator 20 in relation to the rotatable base 54R or mobile rotatable base 54RM.

As with robotic apparatus 10, in robotic apparatus 10F, vertical motion mechanism 30 forms a major vertical axis, while manipulator 20 includes minor horizontal link axes that rotate about vertical axes. All of the arm members are located to the side of the vertical motion mechanism 30, regardless of the posture of the first arm 14, second arm 16, and third arm 18, and regardless of the movement and rotation of mobile rotatable base 54RM. Any end effector configuration can be employed in manipulator 20, provided that the end effector is capable of transferring article W from a first location to a second location.

Figure 20:
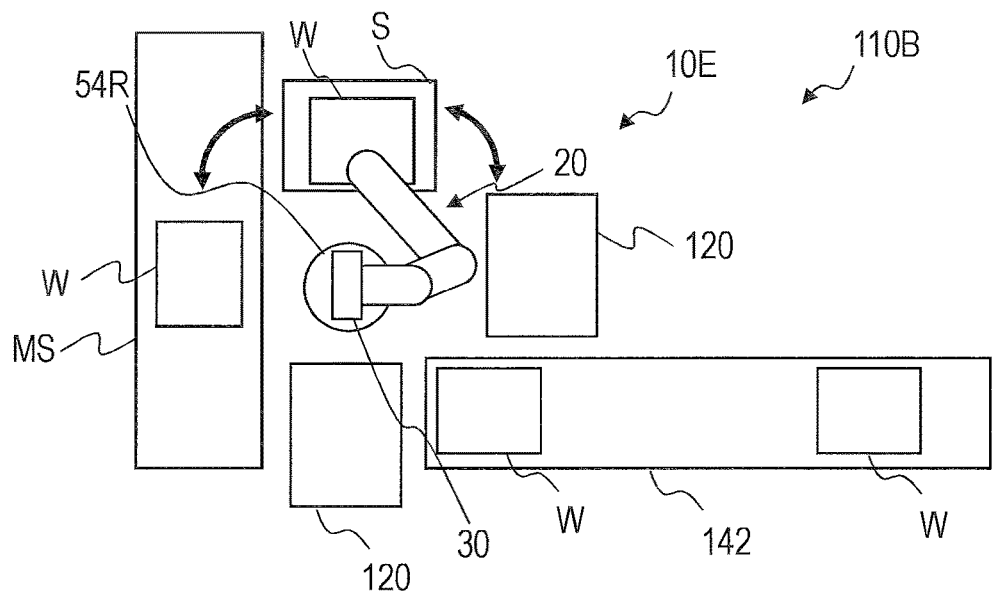
FIG. 20 is a schematic top view of another robotic handling system according to an embodiment of the present invention.
Figure 21:
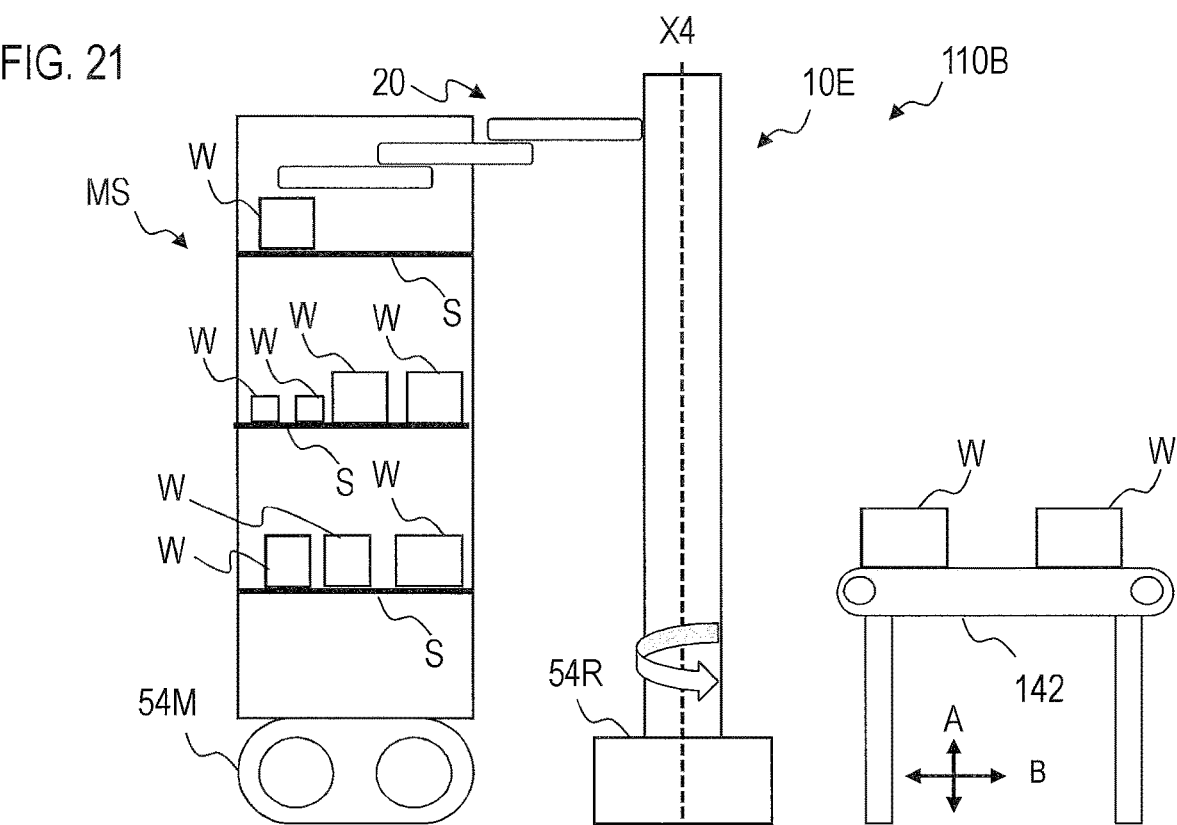
FIG. 21 is a schematic side view of the robotic handling system depicted in FIG. 20.

FIGS. 20 and 21 depict a robotic handling system 110B according to an exemplary embodiment. Robotic handling system 110B includes at least one robotic apparatus. By including a plurality of robotic apparatuses to robotic handling system 110B, productivity can be further increased. FIG. 20 is a top view of robotic handling system 110B in which a robotic apparatus 10E is configured to selectively transfer articles W between various locations. In order to access cart 120, rotatable base 54R places manipulator 20 in an appropriate rotational position. At the position indicated in FIG. 20, rotatable base 54R is in a position in which vertical motion mechanism 30 and manipulator 20 attached thereto face cart 120. While vertical motion mechanism 30 and manipulator 20 of robotic apparatus 10E face cart 120 in this rotational position, manipulator 20 is configured to grasp an article W located on shelf S at a position offset by approximately 90 degrees in either direction relative to a center of manipulator 20 when manipulator 20 is placed in a fully tucked position. After grasping an article W, manipulator 20 is configured to move to transfer article W to a destination position by include rotational movements, movements along curved or linear paths, and lifting or lowering vertical movements. As indicated by the arrows in FIG. 20, article W is moveable from shelf S to cart 120 without rotating rotatable base 54R. By rotating manipulator 20 via rotatable base 54R, article W can also be placed in mobile shelf MS. Mobile shelf MS is supported by a mobile base 54M that manually or autonomously transfers mobile shelf MS to a plurality of locations within a workspace.

FIG. 21 illustrates a side view of robotic handling system 110B. As depicted in FIG. 21, manipulator 20 has rotated about a vertical axis X4 by the drive unit within rotatable base 54R, so as to position manipulator 20 at a location facing mobile shelf MS, which includes a plurality of individual shelves S. The position of manipulator 20 in FIG. 21 is approximately 180 degrees relative to the position of manipulator 20 in the position of FIG. 20. By rotating manipulator 20 between the position in FIG. 20 facing cart 120 and the position in FIG. 21 facing mobile shelf MS, robotic handling apparatus 10E can repeatedly transfer articles W from cart 120 and conveyor 142 to mobile shelf MS. For example, conveyor 142 in FIGS. 20 and 21 repeatedly transfers articles W in a direction toward robotic apparatus 10E. The robotic apparatus 10E grasps an article W located on conveyor 142, rotates about axis X4 while grasping the article W, and subsequently reaches into shelves S of mobile shelf MS, to place articles W in various positions. Thus, shelves S of mobile shelf MS can be filled with articles W similar to the depiction of FIG. 21. Thereafter, mobile shelf MS may autonomously or manually move from the position adjacent to the robotic apparatus 10E to a second location. Articles W can be manually loaded onto conveyor 142, or placed on conveyor 142 by an additional robotic apparatus, for example. The process of transferring articles W can be reversed such that articles W located on mobile shelf MS are first transferred to the working envelope of robotic apparatus 10E and subsequently placed on conveyor 142 to be conveyed to a second location.

A method 700 for robotic article handling will now be discussed with respect to the flowchart presented in FIG. 22. At the start of the method 700 the arms 14, 16, 18, and end effector 22 of manipulator 20 are assumed to be in a fully tucked position. If this is not the case, the arms 14, 16, 18, and end effector 22 can be retracted to the tucked position, or to a position that will not interfere with an obstacle such as shelf S. First, in step S12, control unit 40 determines whether manipulator 20 is located at a desired height and/or rotational position relative to a shelf S and/or article W. This determination can be made in accordance with position information provided by at least one sensor 24 provided on end effector 22, and/or at least one external sensor 124. If the determination is affirmative, the process proceeds to step S14. If the determination is negative, the vertical motion mechanism 30 is required to be activated in order to place manipulator 20 in a desired height in the vertical direction relative to the shelf S and/or article W.

In step S14, control unit 40 activates vertical motion mechanism 30 via vertical motion drive unit 38 to raise or lower manipulator 20 as necessary. Also, when manipulator 20 and vertical motion mechanism 30 are rotatable by rotatable base 54RM, rotation is performed as necessary. As described previously, the activation of vertical motion drive unit 38 moves each of the arms 14, 16, 18, and end effector 22, when moving manipulator 20. None of the respective relative distances between arms 14, 16, 18, and end effector 22 are altered regardless of the operation of vertical motion drive unit 38 during step S14. Once the manipulator is located at a desired height and rotational position, as determined by feedback from vertical motion drive unit 38 and one or more sensors 24 and 124, the process proceeds to step S16. If the robotic apparatus 10 is not capable of rotational motion, steps S12 and S14 only take desired height into account.

When step S16 follows step S14, step S16 can partially overlap with step S14. In step S16, the arms and end effector 22 of manipulator 20 are driven by activating respective ones of the drive units via control unit 40 to cause rotational motion at revolute joints J1-J3 about axes X1-X3. For example, by activating drive units 48A, 48B, and 48C, second arm 16, third arm 18, and end effector 20 are moved within respective horizontal planes H2, H3, and H4. This activation continues until end effector 20 is located adjacent to an article W to be grasped, as can be determined by feedback from each of the drive units 48A-48C and one or more sensors 24 and 124.

In step S18, grasping device 26 is extended toward the article W to be grasped. For example, by an activation of linear motion apparatus 122 by control unit 40, grasping device 26 is moved horizontally toward article W to be grasped until an appropriate grasping position is reached. For example, when grasping device 26 is a suction device, an appropriate grasping position places suction device in at least partial contact with article W. This contact can be detected by feedback from linear motion apparatus 122, for example. When grasping device 26 is a gripping device, an appropriate grasping position is a position in which grasping device can grip and support article W, for example, by gripping opposite sides of article W with robotic fingers. Step S18 can partially overlap with steps S14 and S16.

Once grasping device 26 is in an appropriate location, the article W is grasped in step S20. This is performed by applying suction, contracting robotic fingers, or any appropriate mechanism to sufficiently grasp article W. While grasping force is applied by grasping device 26 to the article W, grasping device 26 is withdrawn, for example, by retracting grasping device 26 with linear motion apparatus 122 in the horizontal direction. An example of steps S18 and S20 is illustrated in FIGS. 13a-13d.

In step S22, the arms and end effector 22 of manipulator 20 are driven by activating respective drive units in a manner similar to that described with respect to step S16. However, rather than placing end effector 20 adjacent to the article W to be grasped, article W is moved, while being grasped, away from its original position on shelf S, for example. Movement is performed, for example, by activating drive units 48A, 48B, and 48C, to move second arm 16, third arm 18, and end effector 20 entirely within respective horizontal planes H2, H3, and H4. The position can be determined by feedback from each of the drive units 48A-48C and one or more sensors 24 and 124. For example, when an overhead shelf S (a potential obstacle) is positioned above article W, and it is desirable to raise article W and manipulator 20 to reach the second position, manipulator 20 is withdrawn from the overhead shelf S above article W in step S22. The withdrawal can continue until each of the arms 16, 18, end effector 22, and article W no longer overlap the obstacle formed by the overhead shelf, or until arms 14, 16, 18, and end effector 22 are placed into a fully tucked position as illustrated in FIG. 1.

Step S22 can follow step S20 and partially overlap with step S20. Also, step S22 can begin simultaneously with step S20, when no obstacles are present in the vertical direction with respect to a path of the article W and manipulator 20 from the first position to the second position. In the event that the first position and the second position are located at the same height, step S22 can be omitted.

Step S24 can partially overlap with steps S20 and S22. During step S24, vertical motion mechanism 30 is activated via vertical motion drive unit 38 to raise or lower manipulator 20 while article W is secured by grasping device 26. Step S24 can begin once, in step S20 or step S22, manipulator 20 has been moved away from potential obstacles above or below manipulator 20. Once control unit 40 determines that the obstacle above or below manipulator 20 will not interfere with a vertical motion, vertical motion mechanism 30 is activated via vertical motion drive unit 38 to raise or lower manipulator 20 as necessary. As described previously, the activation of vertical motion drive unit 38 moves each of the arms 14, 16, 18, and end effector 22, when moving manipulator 20. None of the respective relative distances between arms 14, 16, 18, and end effector 22 are altered regardless of the operation of vertical motion drive unit 38 during step S24. Once the manipulator is located at a desired height, as determined by feedback from vertical motion drive unit 38 and one or more sensors 24 and 124, the process proceeds to step S26.

During step S26, control unit 40 extends grasping device 26 toward the destination position while grasping article W. By activating linear motion apparatus 122, grasping device 26 and article W are together moved horizontally toward the second position for article W. In step S28, once the second position has been reached, grasping device 26 release article W, by terminating suction or by releasing grippers such as robotic fingers. Once article W is released and successfully placed in the destination position, grasping device 26 is withdrawn and in a manner similar to the withdrawal performed in step S20, without moving article W. Manipulator 20 is withdrawn in a manner similar to step S22, without moving article W. The process terminates thereafter and can be repeated for subsequent articles W for transfer.

While the steps S12-S28 in the flowchart of FIG. 22 have been discussed with respect to the structural features of robotic apparatus 10 and 10A, each of the robotic apparatuses 10 and 10A-10F can be used to performed each of the above-described steps.

A method 800 for robotic article handling will now be described with respect to the flowchart presented in FIG. 23. At the start of the method 800 in step S112, control unit 40 determines whether a robotic apparatus 10E or 10F of a robotic handling system 110A or 110B is located in the vicinity of an article W. For example, control unit 40 determines whether a robotic apparatus 10E or 10F is located in a vicinity of an article W for transfer such that the article W is within a working envelope of the robotic apparatus. For example, control unit 40 determines whether the robotic apparatus is located at a first station where shelf S and conveyor 142 are within a working envelope of the robotic apparatus. This determination can be made in accordance with position information provided by at least one sensor 24 provided on end effector 22, and/or at least one external sensor 124. If the determination is affirmative, the process proceeds to step S116.

If the determination in step S112 is negative, the process proceeds to step S114, in which a mobile base is moved to bring the article W within the working envelope of the robotic apparatus. This can be performed, for example, by control unit 40, which instructs mobile rotatable base 54RM of robotic apparatus 10F to move to the first station. Thus, as illustrated in FIG. 19, robotic apparatus 10F can autonomously move from a position illustrated in phantom to an illustration at a first station where the robotic apparatus 10F can reach shelf S and cart 120. At this position, robotic apparatus 10F can also reach the elongated shelf S by rotational movement of mobile rotatable base 54RM. Step S114 can also be performed by autonomous movement of a mobile shelf 54M. Both mobile rotatable base 54RM of a robotic apparatus and a mobile base of mobile shelf 54M can move during step S114. The movement of robotic apparatus 10F and/or mobile shelf 54M can also be manual.

Step S116 follows step S112 or step S114. In step S116, manipulator 20 performs a grasping operation to grasp article W. This can be performed in the same manner as described in steps S12-S20 of method 700. At the conclusion of step S116, an article W is grasped by end effector 22 and the manipulator 20 is withdrawn from shelf S, for example.

Subsequently, in step S118, control unit 40 determines whether the robotic apparatus 10E or 10F is located in a vicinity of a destination for the grasped article W. For example, control unit 40 determines whether the robotic apparatus is located at a second station where a cart 120, conveyor 142, and/or shelf S are within a working envelope of the robotic apparatus. If the determination in step S118 is affirmative, the process proceeds to step S122. If the determination is negative, the process proceeds to step S120.

In step S120, a mobile base is moved while the article W is grasped in order to bring the robotic apparatus 10E or 10F in a position in which the working envelope of the robotic apparatus includes a destination position of the article W. This can be accomplished by moving at least one of mobile rotatable base 54RM and a mobile base of mobile shelf 54M in a manner similar to step S114. Step S120 can be accomplished autonomously by control unit 40, but can be performed manually, if desired.

In step S122, the article W grasped by manipulator 20 is placed in a destination position. Step S122 can be performed in the same manner as steps S22-S28 of method 700, for example. The process of method 800 can then return to start and be repeated for additional articles W.

While the steps S112-S120 in the flowchart of FIG. 23 have been discussed with respect to the structural features of robotic system 110A and 110B including robotic apparatuses 10E and 10F, each of the robotic apparatuses 10 and 10A-10D can be used to performed each of the above-described steps.

Each of the robotic apparatuses 10 and 10A-10D advantageously provide a robotic arm configuration, as achieved by manipulators 20 and 20A-20D, that can be applied in many kinds of picking and placing applications, including manufacturing, warehouse, fulfillment, distribution, and others. When used in such applications, the robotic apparatus is configured to pick and place articles W from storage areas which employ either horizontal shelves, or vertical storage structures. By providing a manipulator having arm members and an end effector on a side of a vertical motion mechanism with revolute joints that do not rotate about a horizontal axis, torque requirements for each of the drive units are reduced. Additionally, power requirements of the robotic apparatus are reduced. Furthermore, by providing a manipulator having arm members and an end effector on a side of a vertical motion mechanism with revolute joints that do not rotate about a horizontal axis, a working range of the robotic apparatus is extended as the robotic apparatus can be fully extended at every vertical position, including the top position and the bottom position.

While each of the robotic apparatuses 10 and 10A-10D have been described as including one end effector 22, a plurality of end effectors 22 can be provided.

While robotic apparatuses 10 and 10A-10C have been described as having a series of arms that are each connected at a lower surface of a more proximal arm, each arm can be connected to an upper surface of the respective proximal arms.

What is claimed is:

1. A robotic handling apparatus comprising:
   a vertical motion mechanism including a vertical motion drive unit;

a first arm member mounted to a side of the vertical motion mechanism relative to a vertical direction, the vertical motion mechanism being configured to move the first arm in the vertical direction, the first arm member longitudinally extending along a first longitudinal axis, the first arm member being non-rotatably mounted relative to the vertical motion mechanism;

a second arm member connected to the vertical motion mechanism via the first arm member, the second arm member longitudinally extending along a second longitudinal axis, the second arm being pivotally connected to the first arm member about a first axis;

a first drive unit configured to drive the second arm member to pivot about the first axis;

an end effector connected to the second arm and configured to transfer an article from a first position to a second position by the motion of the vertical motion mechanism, first arm member, and second arm member; and a controller configured to control the first drive unit, wherein the controller is configured to control the first drive unit to bring the first arm member and the second arm member into a tucked posture in which the second longitudinal axis of the second arm member is aligned with the first longitudinal axis of the first arm member when viewed in the vertical direction, the first arm member and the second arm member overlapping each other in the tucked posture when viewed in the vertical direction, and wherein the second arm member is between the first arm member and the vertical motion drive unit.

2. The robotic handling apparatus according to claim 1, wherein, when the controller controls the first drive unit to bring the first arm member and the second arm member into the tucked posture, the second longitudinal axis of the second arm member is parallel to a third longitudinal axis of the end effector and parallel to the first longitudinal axis of the first arm member, and the end effector is disposed at a position adjacent to the vertical motion mechanism in a horizontal direction.

3. The robotic handling apparatus according to claim 1, wherein the first arm member and the second arm member are incapable of rotation about a horizontal axis.

4. The robotic handling apparatus according to claim 1, wherein the first arm member is disposed within a first horizontal plane, and the second arm member is pivotable in a second horizontal plane that is spaced from and parallel to the first horizontal plane, the first horizontal plane and the second horizontal plane being spaced apart by a first distance, the first distance remaining constant for every posture achievable by the first arm member and second arm member.

5. The robotic handling apparatus according to claim 1, further comprising:
a third arm member pivotably connected to the second arm member, the third arm member longitudinally extending along a third longitudinal axis; and
a second drive unit configured to drive the third arm member to pivot about a second axis,
wherein the controller is configured to control the second drive unit to bring the third arm member into the tucked posture in which the third longitudinal axis is aligned with the first longitudinal axis and the second longitudinal axis when viewed in the vertical direction, and
wherein the first arm member, the second arm member, and the third arm member overlap each other in the tucked posture when viewed in the vertical direction.

6. The robotic handling apparatus according to claim 4, further comprising:
a third arm member pivotably connected to the second arm member; and
a second drive unit configured to drive the third arm member to pivot about a second axis,
wherein the third arm member is pivotable in a third horizontal plane that is spaced from and parallel to the first horizontal plane and the second horizontal plane, and
wherein the second horizontal plane is spaced from the third horizontal plane by a second distance, the second distance remaining constant for every posture achievable by the first arm member and second arm member.

7. The robotic handling apparatus according to claim 1, wherein the vertical motion mechanism includes a motor, a ball screw, and a nut,
the nut being connected to the first arm, and
wherein the motor is configured to rotate one of the ball screw and the nut in relation to an other of the ball screw and the nut to drive the first arm member in the vertical direction.

8. The robotic handling apparatus according to claim 1, wherein the vertical motion mechanism includes a first carriage and a second carriage coupled to the first arm member, the second carriage being configured to be raised and lowered relative to the first carriage in accordance with rotation of a motor driving the second carriage in relation to the first carriage.

9. The robotic handling apparatus according to claim 1, wherein the first arm member is connected to the vertical motion mechanism with a guide, the guide being slidably mounted to a rail and being movable in the vertical direction relative to the rail.

10. The robotic handling apparatus according to claim 1, wherein the end effector includes a sensor configured to detect a distance between the end effector and an obstacle.

11. The robotic handling apparatus according to claim 10, wherein the sensor includes a contact sensor, a proximity sensor, a non-contact sensor, a laser sensor, an optical sensor, or a vision sensor.

12. The robotic handling apparatus according to claim 1, wherein the end effector includes a suction device configured to releasably secure an article.

13. The robotic handling apparatus according to claim 12, wherein the end effector includes a linear motion mechanism configured to extend and retract the suction device.

14. The robotic handling apparatus according to claim 13, wherein the end effector includes a surface adjacent to the suction device configured to support the article when the linear motion mechanism retracts the suction device and the releasably secured article.

15. The robotic handling apparatus according to claim 1, further comprising a rotational base configured to support the vertical motion mechanism and rotate the vertical motion mechanism about a base axis that is parallel to the vertical direction.

16. The robotic handling apparatus according to claim 1, wherein the first arm member and the second arm member are bar links included in a robotic apparatus having four bar links.

17. A robotic handling system comprising:
a robotic handling apparatus including:
a vertical motion mechanism including a vertical motion drive unit;
a first arm member mounted to a side of the vertical motion mechanism relative to a vertical direction, the vertical motion mechanism being configured to move the first arm in the vertical direction, the first arm member longitudinally extending along a first longitudinal axis, the first arm member being non-rotatably mounted relative to the vertical motion mechanism;

a second arm member connected to the vertical motion mechanism via the first arm member, the second arm member longitudinally extending along a second longitudinal axis, the second arm being pivotally connected to the first arm member about a first axis;

a first drive unit configured to drive the second arm member to pivot about the first axis;

an end effector connected to the second arm and configured to transfer an article from a first position to a second position by the motion of the vertical motion mechanism, first arm member, and second arm member;

a mobile platform configured to move between a plurality of orientations or positions in a workspace; and a controller configured to control the first drive unit, wherein the controller is configured to control the first drive unit to bring the first arm member and the second arm member into a tucked posture in which the second longitudinal axis of the second arm member is aligned with the first longitudinal axis of the first arm member when viewed in the vertical direction, the first arm member and the second arm member overlapping each other in the tucked posture when viewed in the vertical direction, and wherein the second arm member is between the first arm member and the vertical motion drive unit.

18. The robotic handling system according to claim 17, wherein the robotic handling apparatus is mounted to the mobile platform such that the robotic handling apparatus is movable between a plurality of stations in the workspace.

19. The robotic handling system according to claim 17, wherein the robotic handling apparatus is mounted to a rotational base formed by the mobile platform.

20. The robotic handling system according to claim 17, wherein the mobile platform is an autonomous platform configured to deliver a workpiece to a working area of the robotic apparatus.

21. The robotic handling system according to claim 17, wherein the first arm member and the second arm member are incapable of rotation about a horizontal axis.

22. A method for robotic article handling, the method comprising:

moving a first arm member and a second arm member connected to the first arm member by a vertical motion mechanism including a vertical motion drive unit, the first arm member being non-rotatably mounted relative to the vertical motion mechanism;

pivoting the second arm member about a first axis so as to position an end effector connected to the second arm at a position adjacent to an article;

grasping an article located at a first position with a grasping device of an end effector; and transferring the article from the first position to a second position, wherein, during the moving, pivoting, grasping, and transferring, the first arm member, the second arm member, and the end effector are mounted to a side of the vertical motion mechanism relative to a vertical direction, wherein, during at least one of the moving, pivoting, grasping, and transferring, a first longitudinal axis of the first arm member is aligned with a second longitudinal axis of the second arm member in a tucked position when viewed in the vertical direction, the first arm member and the second arm member overlapping each other in the tucked position when viewed in the vertical direction, and wherein the second arm member is between the first arm member and the vertical motion drive unit.

23. The method according to claim 22, wherein the pivoting the second arm member about the first axis is performed without rotating the first arm member and the second arm member about a horizontal axis.

24. The method according to claim 22, wherein the grasping of the article is performed while maintaining the first arm member and the second arm member in a single orientation.

25. The method according to claim 22, further comprising:

pivoting a third arm member connected to the second arm member about a second vertical axis, wherein the first arm member is disposed within a first horizontal plane, and the second arm member is pivotable in a second horizontal plane that is spaced from and parallel to the first horizontal plane, a distance between the first horizontal plane and the second horizontal plane being constant during an entirety of the moving, pivoting, grasping, and transferring.

26. The method according to claim 22, wherein the first arm member and the second arm member are incapable of rotation about a horizontal axis.

27. The method according to claim 22, further comprising autonomously moving a robotic apparatus including the first arm member and the second arm member by a mobile base to a position adjacent to the article at the first position before grasping the article.

* * * * *